(12) United States Patent
Miyazaki et al.

(10) Patent No.: US 6,173,799 B1
(45) Date of Patent: Jan. 16, 2001

(54) MOTOR-ASSISTED SINGLE-WHEEL CART

(75) Inventors: Atsushi Miyazaki; Naotoshi Ono; Hirohide Shimizu; Hiroshi Sueshige; Kazuyoshi Miyahara; Teruhiko Otsuki; Hiroo Kanke, all of Wako (JP)

(73) Assignee: Honda Giken Kogyo Kabushiki Kaisha (JP)

(*) Notice: Under 35 U.S.C. 154(b), the term of this patent shall be extended for 0 days.

(21) Appl. No.: 09/179,055

(22) Filed: Oct. 26, 1998

(30) Foreign Application Priority Data

| Oct. 27, 1997 | (JP) | ................................................ 9-293771 |
| Nov. 28, 1997 | (JP) | ................................................ 9-329194 |
| Dec. 8, 1997 | (JP) | ................................................ 9-337334 |

(51) Int. Cl.$^7$ ................................................ B62D 51/04
(52) U.S. Cl. .......................... 180/19.3; 180/65.6; 280/78
(58) Field of Search ................................ 180/19.1, 19.2, 180/19.3, 65.1, 65.5, 65.6, 65.7, 65.8; 280/78

(56) References Cited

U.S. PATENT DOCUMENTS

| 2,601,752 | * | 7/1952 | Rose ..................................... 180/19.3 |
| 2,638,172 | * | 5/1953 | Borchin et al. ..................... 180/19.1 |
| 3,364,417 | * | 1/1968 | Norton ................................ 180/19.3 |
| 3,791,470 | * | 2/1974 | Baddorf et al. .................... 180/19.1 |
| 3,891,043 | * | 6/1975 | Valdex .................................. 180/13 |
| 4,589,508 | * | 5/1986 | Hoover et al. ...................... 180/19.1 |
| 5,489,000 | * | 2/1996 | Hillbohm ............................. 180/19.1 |
| 5,732,786 | * | 3/1998 | Fujigaki ............................... 180/19.3 |
| 5,878,827 | * | 3/1999 | Fox ....................................... 180/19.1 |

FOREIGN PATENT DOCUMENTS

| 691232A2 | 1/1996 | (EP) . |
| 867353A2 | 9/1998 | (EP) . |
| 2191513 | 2/1974 | (FR) . |
| 1056847 | 2/1967 | (GB) . |
| 1529791 | 10/1978 | (GB) . |
| 51-39970 | 9/1976 | (JP) . |
| 62-196736 | 12/1987 | (JP) . |
| 2108679 | 8/1990 | (JP) . |

* cited by examiner

Primary Examiner—Kevin Hurley
(74) Attorney, Agent, or Firm—Adams & Wilks

(57) ABSTRACT

A motor-assisted single-wheel cart is provided with a motor for generating an assisting power in response to an operation force when operating an operation handle by a human hand, and a power transmission mechanism for transmitting an output of the motor to an axle. The motor is arranged rearwardly upwardly of the axle so as to be positioned within a space surrounded by an upper horizontal member and a lower member positioned below the upper horizontal member constituting a vehicle body frame constituting the cart as viewing the vehicle body frame from a side surface thereof. The power transmission mechanism has a first speed reduction mechanism arranged near the motor, a second speed reduction mechanism arranged near the wheel and a transmission shaft for connecting them. The transmission shaft is inserted to the first and second speed reduction mechanisms so as to be capable of being drawn out.

9 Claims, 15 Drawing Sheets

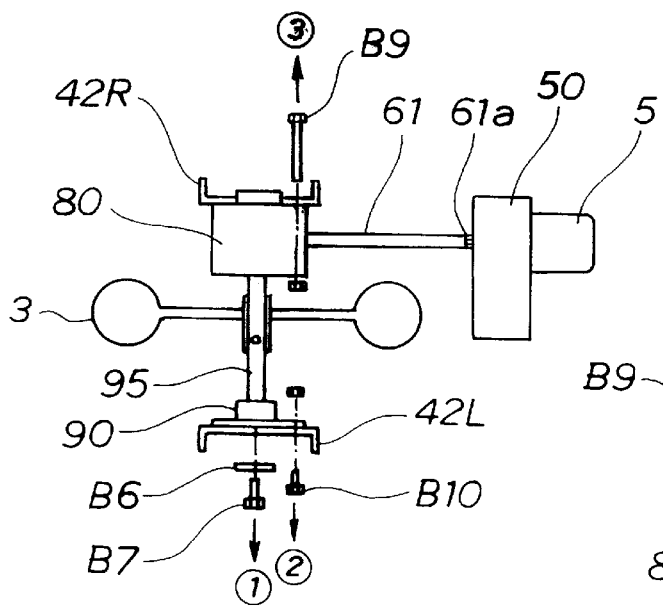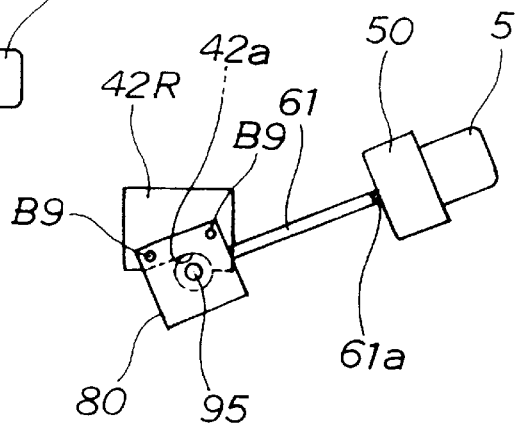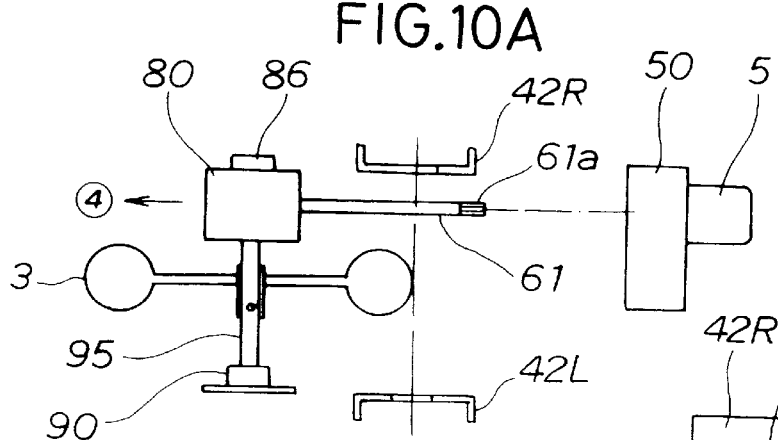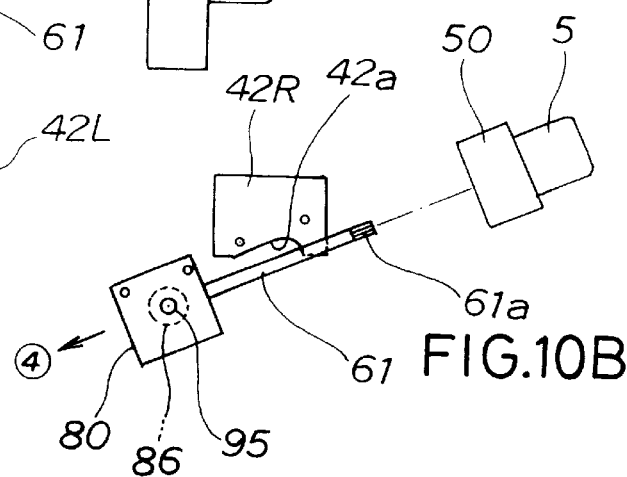

MOTOR-ASSISTED SINGLE-WHEEL CART

BACKGROUND OF THE INVENTION

1. Field of the Invention

The present invention relates generally to a single-wheel cart and, more particularly, to a motor-assisted single-wheel cart wherein an assist force corresponding to an operator's hand operational force is produced by a motor and applied to a wheel of the cart to thereby lighten the operational force.

2. Description of the Related Art

A hand-pushed single-wheel cart, also called a wheelbarrow, is used at various places including construction spots and farmland since it is small and capable of making sharp turns. The single-wheel cart with such a simple arrangement requires an operator to bear a considerable burden when carrying a heavy article thereon and climbing up a slope.

To reduce such an operator's burden, one may propose a single-wheel cart which is self-propelled by a motive power. Such self-propelled carts are known from, for example, Japanese Utility Model Laid-Open Publication No. SHO-62-196736 entitled "APPARATUS FOR CONTROLLING PROPELLING OR POWERED SINGLE-WHEEL CART" and Japanese Utility Model Publication No. SHO-51-39970 entitled "ELECTRIC CART".

The powered single-wheel cart disclosed in Japanese Utility Model Laid-Open Publication No. SHO-62-196736 is constructed so as to drive a single wheel through a belt and a centrifugal clutch by a motor comprised of an engine, as shown in FIG. 1 of the publication. Further, in the powered single-wheel cart, a throttle lever is provided at an end portion of a handle extending rearwardly upwardly from a bed frame and a rotational speed of the motor is controlled by operating the throttle lever. Since the powered single-wheel cart is self-propelled, the operator's burden is lightened when carrying a heavy article thereon and climbing up a slope. However, on the contrary, mobility and usability are no better than the hand-pushed single-wheel cart. At construction sites and in a plant culture house covered with a vinyl, for example, since there is a ground unevenness in addition to a work space being narrow, it is necessary to frequently adjust a propelling speed and a propelling direction of the single-wheel cart. For this use, the powered single-wheel cart leaves room for further improvements.

The powered single-wheel cart is not suitable for an operational environment within the culture house due to an exhaust gas and engine sounds. Further, a certain degree of skill is required for controlling an output force of the engine.

Further, the powered single-wheel cart is construction such that the motor is disposed in a low and narrow space below the bed frame, so that it is hard to perform a maintenance and inspection operation for the motor. Still further, when the powered single-wheel cart is used in a muddy place, care must be taken to prevent water from entering the motor disposed in a low position. When the motor is arranged on the bed frame, a center of gravity of the powered single-wheel cart is placed at a high position while the space for the bed frame becomes narrow.

The motor cart disclosed in Japanese Utility Model Publication SHO-51-39970 is constructed such that right and left front wheels and a caster rear wheel are mounted below a base plate for a bed and the front wheels are driven by a reversible motor for driving, as shown in FIGS. 1 and 2 of the publication.

Also in the motor cart, mobility and usability are no better than the hand-pushed single cart. Further, in the motor cart, in addition to the reversible motor, it is necessary to mount a heavy battery and a heavy box body installing electrical control devices therein. Even where the motor cart is modified to a single-wheel cart, as heavy articles such as the reversible motor and the battery are simply mounted, there is a risk that operability of the single-wheel cart goes down.

Further, since the motor cart is constructed such that the reversible motor for driving is arranged in the low and narrow space below the base plate for the bed, it is hard to perform a maintenance and inspection operation of the reversible motor. Further, it becomes necessary to take care for preventing water from entering the reversible motor disposed in the low position.

Still another self-propelled cart is known from Japanese Utility Model Laid-Open Publication HEI-2-108679 entitled "SINGLE-WHEEL CART WITH MOTOR".

In the motor-equipped single-wheel cart just mentioned, a single wheel is driven by an internal combustion engine or a battery-powered electric motor through a reduction gear and a power transmission chain, as shown in FIG. 1 of the publication. The internal combustion engine or the battery-powered electric motor, the reduction gear and the wheel are mounted to a pipe frame below the bed.

However, since the single-wheel cart with the motor is arranged in such a manner as to transmit an output of the internal combustion engine or the battery-powered motor to the wheel and a height of the bed is increased in accordance with a diameter of a sprocket, there are problems such that it is troublesome to load and unload a cargo on board, that a maintenance and inspection operation is required for periodically adjusting an extension of the power transmission chain, and that it is easily affected by a mud splash during operation and the like.

Further, in the motor-carrying single-wheel cart, for taking off the wheel from the pipe frame, the power transmission chain must be taken off first. Accordingly, tire changing becomes tedious and time-consuming.

SUMMARY OF THE INVENTION

It is therefore an object of the present invention to provide a single-wheel cart which lightens a burden of an operator, provides mobility and usability of a hand-pushed single-wheel cart even in a narrow operation area, and has good operability.

Another object of the present invention is to provide a single-wheel cart in which a maintenance and inspection operation of a motor can be easily performed, a motor is prevented from being entered by a water, and a wheel change operation can be made simply.

In accordance with a first aspect of the present invention, there is provided a motor-assisted single-wheel cart which comprises: a vehicle body frame constituted by a pair of right and left side frame members each having an upper horizontal member and a lower member positioned below the upper horizontal member and being apart from each other in a lateral direction; an axle rotatably mounted to the lower member and positioned slightly in front of a center portion of the vehicle body frame in a longitudinal direction; a single wheel mounted to the axle so as to be positioned in a center portion of the vehicle body frame in a lateral direction; a pair of right and left operation handles extending rearward from each of the upper horizontal members; a bed mounted to an upper portion of the vehicle body frame; a battery mounted to the lower member and arranged to the lower member and generating an assisting power in correspondence to an operation force applied to the operation handle by a human hand; and a power transmission mechanism for transmitting an output of the motor to the axle, wherein when the vehicle body frame is viewed from a side surface, each lower member comprises a horizontal portion extending in parallel to the upper horizontal member, a front vertical portion extending upwardly and vertically from a front end of the horizontal portion, a leg portion bending downwardly from a rear end of the horizontal portion substantially in a V-shaped manner, and a rear vertical portion extending upward from the rear and upper portion of the leg portion in parallel to the front vertical portion, and the motor is arranged rearwardly upwardly of the axle so as to be within a space surrounded by the lower member and the upper horizontal member.

With this arrangement, it is possible to advance the motor-assisted single-wheel cart in the same manner as a general wheelbarrow by pushing the operation handle while lifting it up, whereby the cart becomes easy to operate. When the load is heavy, the operation handle is strongly pushed so that the assisting power corresponding to the pushing force is generated by the motor, whereby the burden of the operator can be lightened. When the cart is vacant or the load is light at a time of operation, the pushing force applied to the operation handle is small, so that the assisting power is not generated in the motor. Thus, by pushing the operation handle, the motor-assisted single-wheel cart can be driven by only the human power and/or the assisting power applied from the motor to the wheel.

Since the motor is arranged rearwardly and upwardly of the axle so as to arrange the motor at a high position, it is easy to consider a countermeasure for water proof of the motor.

Since the motor is arranged within the space formed by the upper horizontal member and the lower member constituting the side frame member, a state of the motor can be viewed through the space and it becomes possible to perform a maintenance and inspection operation of the motor through the space.

In accordance with a second aspect of the present invention, there is provided a motor-assisted single-wheel cart which comprises: a single wheel mounted to a center portion of a vehicle body frame in a lateral direction; a battery mounted to the vehicle body frame; a motor mounted to the vehicle body frame and generating an assisting power in correspondence to an operation force by a human hand; a power transmission mechanism mounted to the vehicle body frame and for transmitting an output of the motor to a wheel; an operation handle extending rearward from the vehicle body frame; and a bed mounted to an upper portion of the vehicle body frame, wherein the power transmission mechanism comprises a first speed reduction mechanism arranged near the motor, a second speed reduction mechanism arranged near the wheel and a transmission shaft for connecting the first and second speed reduction mechanisms, and an end of the transmission shaft is inserted to the first speed reduction mechanism or the second speed reduction mechanism in such a manner as to freely pull out.

In the thus-arranged cart, since a shaft drive system using the transmission shaft is employed as the power transmission mechanism, it is possible to lower a height of the bed from the ground in comparison with a chain drive system and a belt drive system. A maintenance and inspection operation for adjusting an extension which is necessary in the chain drive system and the belt drive system is not required.

The second speed reduction mechanism arranged near the wheel can be pulled out from the first speed reduction mechanism together with the transmission shaft, or pulled out from the transmission shaft. Accordingly, the second speed reduction mechanism can be separated from the first speed reduction mechanism only by the pulling out operation of the second speed reduction mechanism. In order to replace the wheel, after taking out the second speed reduction mechanism from the vehicle body frame, the wheel is separated from the second speed reduction mechanism.

An end of the transmission shaft is inserted to the first speed reduction mechanism in such a manner as to be freely pulled out, the other end is inserted to the second speed reduction mechanism, an end of the axle for the wheel is inserted to the second speed reduction mechanism in such a manner as to cross the transmission shaft, and the wheel is mounted in such a manner as to be taken out from the other end of the axle for the wheel. In order to replace the wheel, the end of the transmission shaft is pulled out from the first speed reduction mechanism so as to be taken out from the vehicle body frame together with the second speed reduction mechanism and the wheel, and thereafter, the wheel is taken out from the axle for the wheel inserted to the second speed reduction mechanism.

In accordance with a third aspect of the present invention, there is provided a motor-assisted single-wheel cart which comprises: a vehicle body frame; at least one wheel mounted to the vehicle body frame; a motor mounted to the vehicle body frame and generating an assisting power in correspondence to an operation force by a human hand; a battery mounted to the vehicle body frame; an operation handle extending rearwardly upwardly from the vehicle body frame; a grip slidably provided at an end portion of the operation handle; an elastic member urging the grip to a side of an operator; a moving amount detecting portion for detecting a moving amount of the grip toward of the vehicle body frame; and a control portion mounted to the vehicle body frame and for controlling the motor in response to an output of the moving amount detecting portion.

In the cart thus arranged, the grip is slid in response to the pushing force by clasping the grip so as to push the cart, and the moving amount detecting portion detects the moving amount. The motor generates the assisting power in response to the output of the moving amount detecting portion. The assisting power is added for rotation of the wheel. By clasping the grip and pushing the motor-assisted cart, the operator can propel the cart only by a human force and propel the cart in a state that the assisting power from the motor is applied. Accordingly, a specific operation for adjusting the assisting power is not required.

The elastic member is arranged inside the grip so as not to be exposed to a mud water and a dust and not to be seen from an outer portion.

BRIEF DESCRIPTION OF THE DRAWINGS

Preferred embodiments in accordance with the present invention will be described in detail below, by way of example only, with reference to accompanying drawings, in which:

FIGS. 9A and 9B are schematic views illustrating an operation of taking off of a second speed reduction mechanism, the axle and the wheel;

FIGS. 10A and 10B are schematic views illustrating a state of taking off of the second speed reduction mechanism, the axle and the wheel from the first speed reduction mechanism;

DETAILED DESCRIPTION OF THE PREFERRED EMBODIMENTS

The following description is merely exemplary in nature and is in no way intended to limit the invention or its application or uses.

The terms "front", "rear", "left", "right", "upper" and "lower" used herein represent directions as seen from an operator. Reference symbols Fr, Rr, L and R respectively indicate front, rear, left and right directions.

Figure 1:
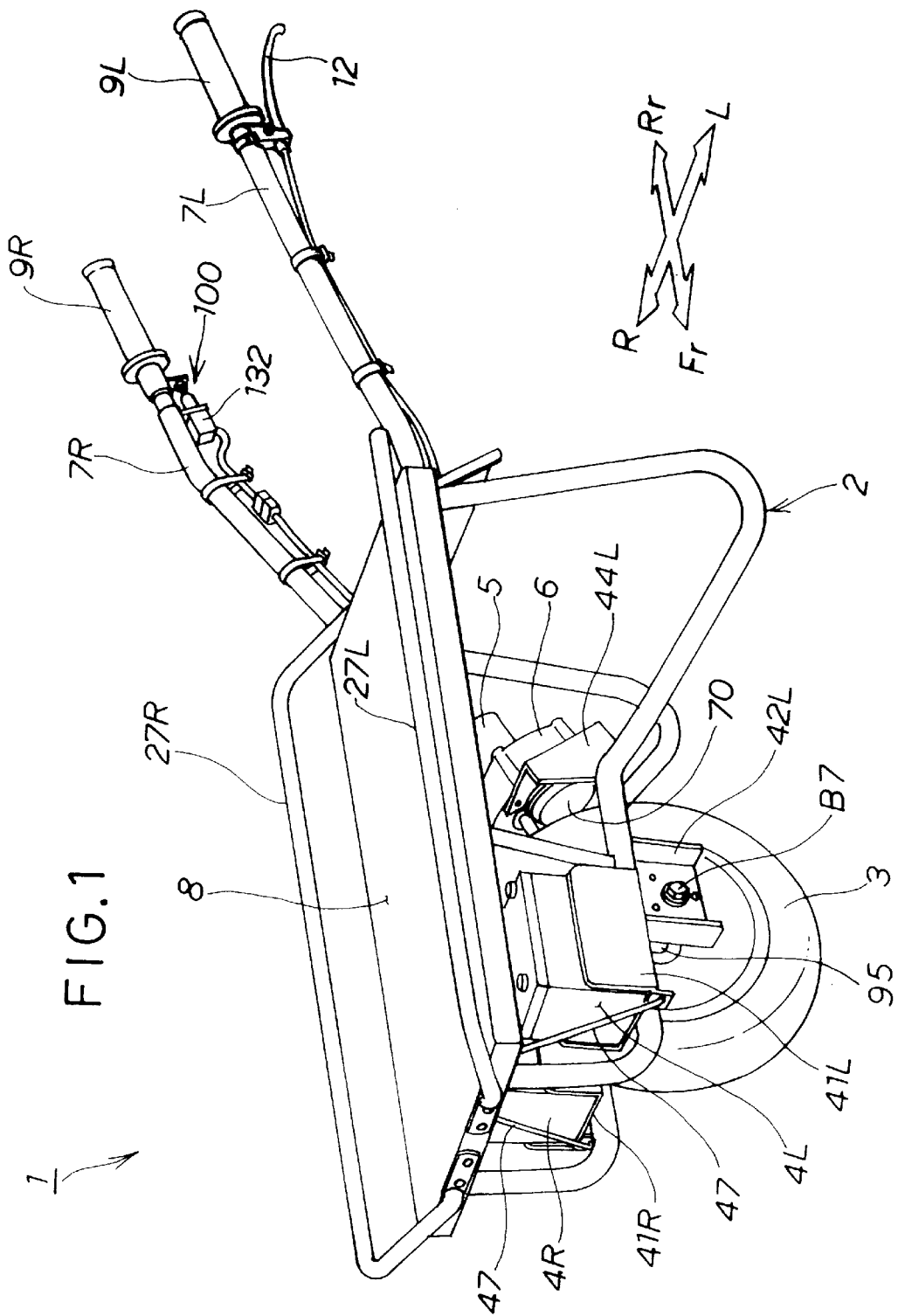
FIG. 1 is a perspective view of a motor-assisted single-wheel cart in accordance with the present invention.

In FIG. 1, a motor-assisted single-wheel cart 1 includes a vehicle body frame 2, a single wheel 3 and a bed 8. Two batteries 4L and 4R, a motor 5 and a power transmission mechanism 6 for transmitting an output of the motor 5 to the wheel 3 are mounted to the vehicle body frame 2. Left and right operation handles 7L and 7R for operating the single-wheel cart 1 extend rearward from the vehicle body frame 2. The bed 8 is formed so as to have a channel-like cross section and mounted to an upper portion of the vehicle body frame 2 so as to cover. The motor 5 generates an assisting power in response to an operation force by a human hand. The motor-assisted single-wheel cart 1 corresponds to a cart of a walking type which is structured such as to assist a rotation of the wheel 3 by the assisting power.

The left and right operation handles 7L and 7R correspond to bar handles extended so as to be inclined rearwardly upwardly from the vehicle body frame 2. These bar handles 7L and 7R respectively have grips 9L and 9R at end portions. The right grip 9R is structured to be slidable to the operation handle 7R. The right operation handle 7R is provided with a moving amount detecting portion 132 for detecting a moving amount of the right grip 9R. In accordance with the present invention, the slidable right grip 9R and the moving amount detecting portion 132 may be mounted to the left operation handle 7L. The batteries 4L and 4R correspond to sealed type batteries. In the drawing, reference numeral 12 denotes a brake lever, and reference numeral 70 denotes a brake. Reference numeral 100 denotes an assisting power operation mechanism.

Figure 2:
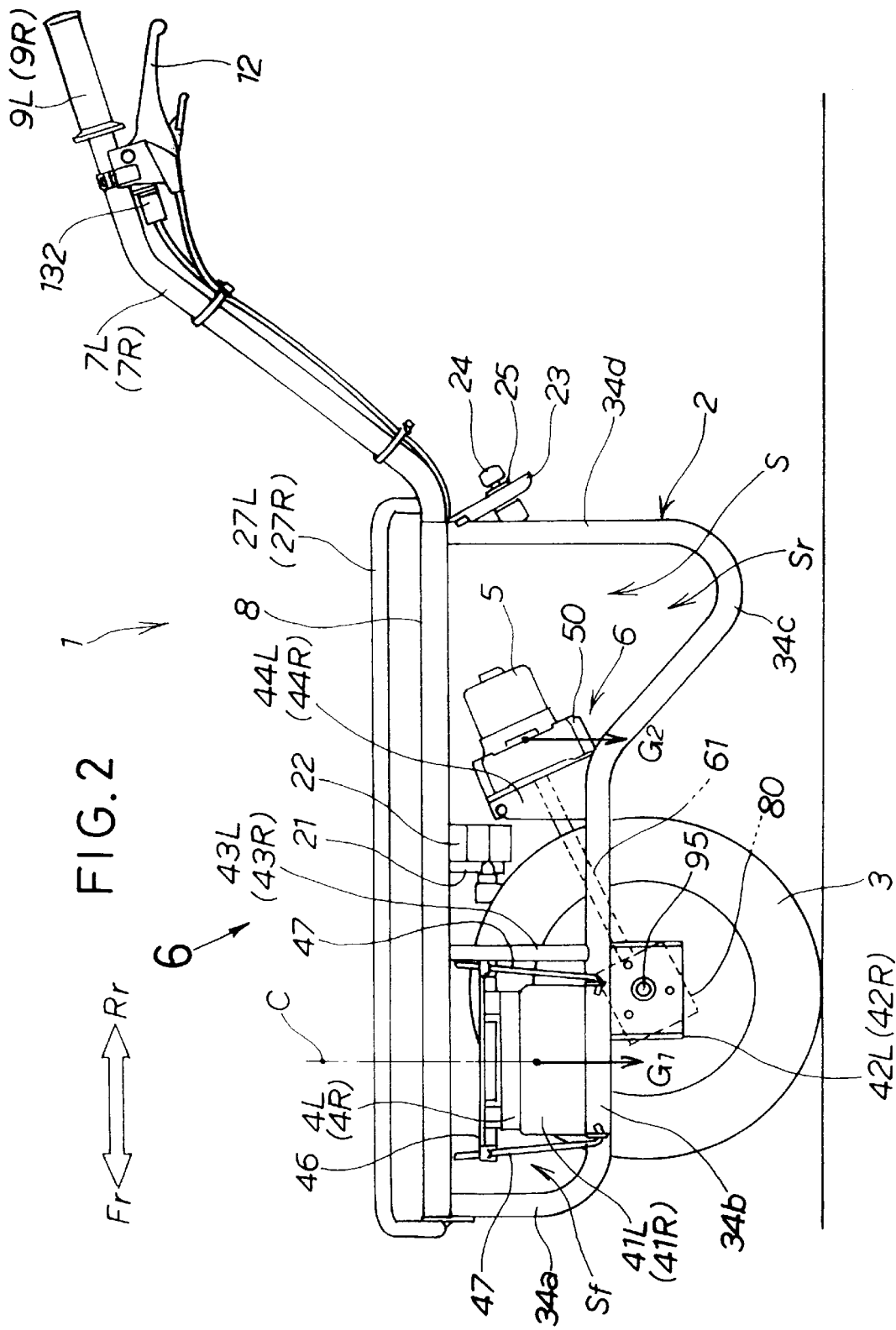
FIG. 2 is a side elevational view of the motor-assisted single-wheel cart as shown in FIG. 1.

In FIG. 2, a control portion 22 is mounted to the vehicle body frame 2 through a hanger 21 below the bed 8. The control portion 22 controls the motor 5 in response to an output of the moving amount detecting portion 132.

The power transmission mechanism 6 corresponds to a mechanism for transmitting a power of the motor 5 to the wheel 3 through an axle 95, and is provided with a first speed reduction mechanism 50 connected to the motor 5, a transmission shaft 61 connected to the first speed reduction mechanism 50 and a second speed reduction mechanism 80 connected to the transmission shaft 61.

The first speed reduction mechanism 50 is structured such as to reduce a rotational speed of the motor 5 and installs a one-way clutch 53 (refer to FIG. 6) capable of transferring a power from the motor 5 only to the axle 95 therewithin. The second speed reduction mechanism 80 further reduces an output rotational speed of the first speed reduction mechanism 50 so as to transmit to the axle 95. The first speed reduction mechanism 50 is arranged near the motor 5. The second speed reduction mechanism 80 is arranged near the wheel 3. The axle 95 corresponds to an axis for supporting the wheel 3, and is mounted to the vehicle body frame 2 through brackets 42L and 42R for the axle in such a manner as to be positioned slightly in front of a middle position of the vehicle body frame 2 in a longitudinal direction. The axle 95 rotates together with the wheel 3.

The left and right batteries 4L and 4R, the motor 5 and the power transmission mechanism 6 are arranged in such a manner as to be within a space S surrounded by the vehicle body frame 2 constituted by a pipe frame in the case of being seen from a side surface of the single-wheel cart 1 shown in FIG. 2. The batteries 4L and 4R are arranged so that a center C of the batteries 4L and 4R is in front of the axle 95. The motor 5 is arranged in the space S surrounded by the vehicle body frame 2 disposed rearwardly upwardly of the axle 95. The second speed reduction mechanism 80 is coaxially arranged on the axle 95. The transmission shaft 61 extends so as to be upward inclined rearward from the second speed reduction mechanism 80. The first speed reduction mechanism 50 is connected on an extension of the transmission shaft 61.

As mentioned above, in the power transmission mechanism 6, since the speed reduction mechanism is structured to be separated into the first speed reduction mechanism 50 and the second speed reduction mechanism 80, a reduction ratio of the first speed reduction mechanism 50 is reduced at a degree of separation. Accordingly, the first speed reduction mechanism 50 is made compact and light at a degree that the reduction ratio is small. Since the second speed reduction mechanism 80 is coaxially arranged on the axle 95, it gives no influence to a weight balance in a longitudinal direction of the single-wheel cart 1 in the case of setting the axle 95 as a supporting point.

As mentioned above, a force necessary for lighting up the operation handles 7L and 7R is reduced at a degree that the first speed reduction mechanism 50 is lightened, and an operation force of the handle is also reduced. Accordingly, a burden of the operator can be lightened, a steering feeling is good and a turning performance is improved.

A center of gravity $G_1$ of the left and right batteries 4L and 4R corresponding to one of the heavy articles is positioned in front of the axle 95. A center of gravity $G_2$ of an assembly constituted by the motor 5 and the first speed reduction mechanism 50 and corresponding to another of the heavy articles is positioned at the rear of the axle 95. The weight balance in a longitudinal direction of the vehicle body (the motor-assisted single-wheel cart 1) in the case of setting the axle 95 as a supporting point is set to be a rate of substantially 4:6 between front and rear.

The motor-assisted single-wheel cart 1 is structured such that the operator lifts up the left and right operation handles 7L and 7R and propels the vehicle body with balancing in a longitudinal direction. When the weight in a longitudinal direction of the vehicle body in the case of setting the axle 95 as a supporting point is balanced, a force necessary for lifting up the operation handles 7L and 7R may be small.

However, when it is intended to stop the motor-assisted single-wheel cart 1, a rotational moment in a direction of lifting up is applied to the operation handles 7L and 7R. Accordingly, for the operation, an operation can be easily performed in the case that the weight of the rear portion of the vehicle body is set to be heavier to a degree such that the rotational moment in the direction of lifting up can be a little damped by the own weight. This is the reason why the rear portion of the vehicle body is set to be slightly heavier.

As mentioned above, when the weight balance in a longitudinal direction of the motor-assisted single-wheel cart 1 is set to be a best condition, a force of the operator necessary for lifting up the operation handles 7L and 7R, and the handle operation force may become small, a steering feeling is good and a turning performance is improved.

Since the power transmission mechanism 6 in accordance with this embodiment is made a shaft drive system, an operation of adjusting an extension of a chain or a belt in the case of a conventional chain drive system or a belt drive system is not required.

In a hand-pushed single-wheel cart including the motor-assisted single-wheel cart 1, it is preferable that a height of the bed 8 from the ground is low to a certain degree so as to make a loading and unloading operation of various kinds of cargo on board such as earth and sand, farm products, construction materials and the like. In order to improve a steering performance of the hand-pushed type single-wheel cart, it is preferable that a center of gravity in a state of loading the cargo on board is set to be low. In order to lower the center of gravity, it is preferable that the height of the bed 8 from the ground is set to be low. However, in the conventional chain drive system or the belt system, the height of the bed from the ground becomes high in response to a diameter of a sprocket and a pulley.

On the contrary, since the power transmission mechanism 6 of this embodiment is a shaft drive system, the height of the bed 8 from the ground can be lowered to a level of the height of the bed in the general hand-pushed type single-wheel cart. The height of the bed 8 from the ground in accordance with this embodiment is about 400 mm.

Since the batteries 4L and 4R, the motor 5 and the power transmission mechanism 6 corresponding to the heavy articles are arranged near the axle 95 corresponding to a supporting point of the weight balance in a longitudinal direction, a force necessary for lifting up the operation handles 7L and 7R becomes small.

The batteries 4L and 4R and the motor 5 are received within the space S surrounded by the vehicle body frame 2, and do not protrude outward from the vehicle body frame 2. Accordingly, the batteries 4L and 4R and the motor 5 are protected by the vehicle body frame 2, so that there is no fear that the batteries 4L and 4R and the motor 5 are directly brought into contact with an obstacle.

Among the space S surrounded by the vehicle body frame 2, a space portion in front of connection members 43L and 43R is set to be a front space portion Sf, and a space portion at the rear of the connection members 43L and 43R is set to be a rear space portion Sr. The rear space portion Sr is wider than the front space portion Sf at a degree of a space surrounded by a leg portion 34c largely curved substantially in a V shape. Then, the motor 5 is arranged in the wider rear space portion Sr. Accordingly, a state of the motor 5 can be viewed through the rear space portion Sr, and a maintenance and inspection operation of the motor 5, the first speed reduction mechanism 50 and parts in the periphery thereof can be easily performed.

As shown in the drawing, when viewing the vehicle body from a side surface thereof, the second speed reduction mechanism 80 is coaxially positioned on the axle 95. A transmission shaft 61 upward inclined rearward with respect to an axis of the axle 95 extends from the second speed reduction mechanism 80. The motor 5 and the first speed reduction mechanism 50 are arranged on an extension of the transmission shaft 61. That is, since the motor 5 corresponding to an electric product is arranged at a high position above the rear portion of the axle 95, it is preferable for a water proof performance.

In the power transmission mechanism 6, the first speed reduction mechanism 50 to which the motor 5 is assembled is mounted to the left and right horizontal portions 34b and 34b through the brackets 44L and 44R for the first speed reduction mechanism. The second speed reduction mechanism 80 is mounted to the right horizontal portion 34b through the right bracket 42R for the axle (refer to FIG. 3).

Since all the upper surface of the vehicle body frame 2 is covered with the bed 8, the wheel 3, the batteries 4L and 4R, the motor 5 and the power transmission mechanism 6 arranged below the bed are protected from a cargo on board, a water, a mud, a dust and the like.

Since the left and right batteries 4L and 4R are arranged at the rear of the front end of the vehicle body frame 2, these batteries 4L and 4R can be protected by the vehicle body frame 2 from the front obstacle.

The motor-assisted single-wheel cart 1 is structured such that two batteries 4L and 4R corresponding to a heavy article are arranged at right and left symmetrical positions with respect to the wheel 3 in order to balance the weight in a lateral direction, as shown in FIG. 1. Since the wheel 3 and the left battery 4L, and the wheel 3 and the right battery 4R are respectively separated from each other through battery holders 41L and 41R, there is no fear that a foreign material is bitten between the wheel 3 and the batteries 4L and 4R. The battery holders 41L and 41R also serve to prevent the right and left batteries 4L and 4R from dropping down.

Figure 3:
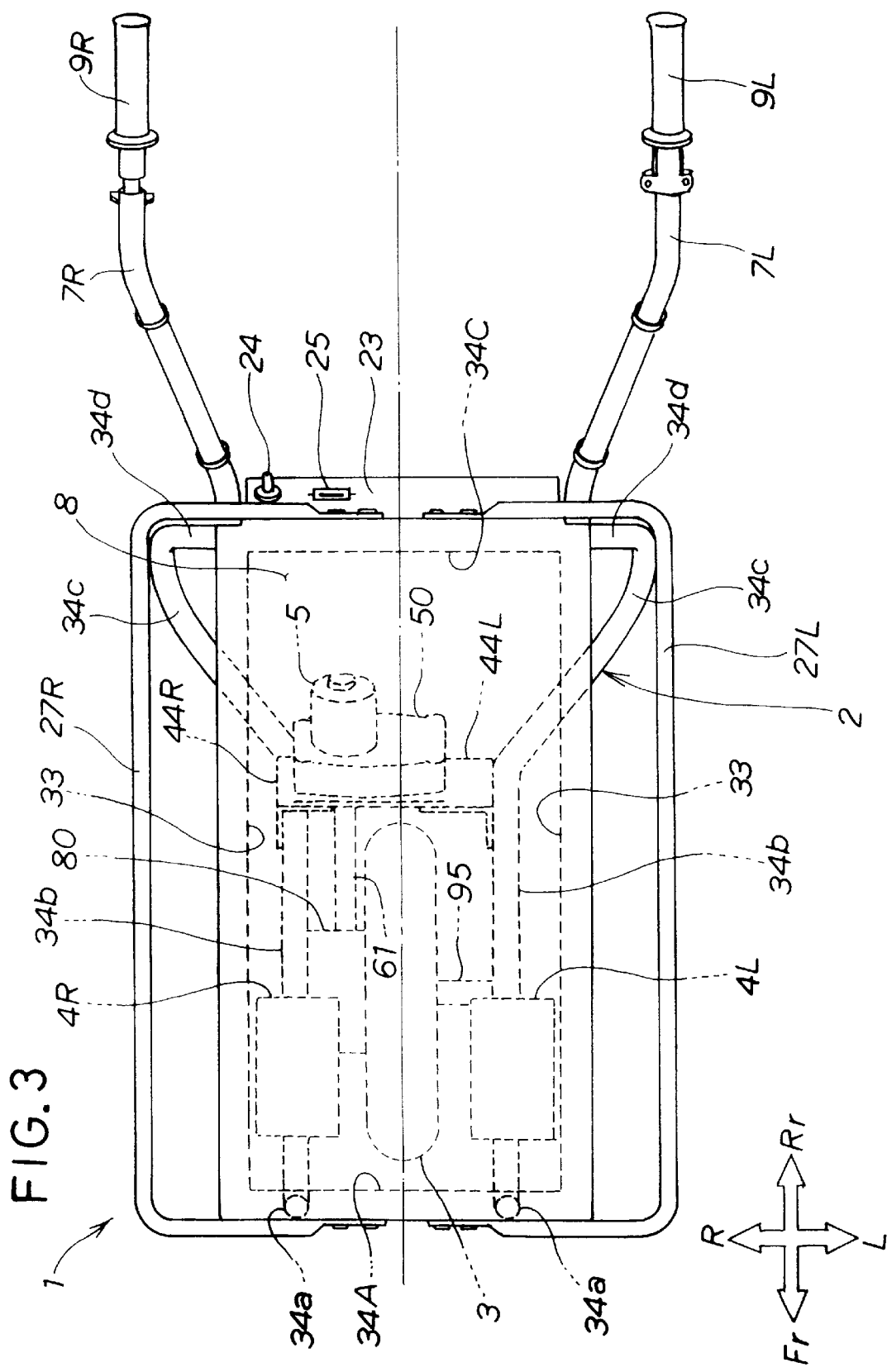
FIG. 3 is a plan view of the motor-assisted single-wheel cart as shown in FIG. 1.

FIG. 3 is a plan view of a motor-assisted single-wheel cart in accordance with the present invention. In FIG. 3, the wheel 3 is arranged substantially in the middle of the vehicle body frame 2 in a lateral direction. Two batteries 4L and 4R are arranged at left and right of the vehicle body frame 2. The motor 5, the first speed reduction mechanism 50, the transmission shaft 61 and the second speed reduction mechanism 80 are arranged at a right side of the center in a lateral direction.

A key switch 24 and a battery residual quantity indicator 25 are mounted to a mounting plate 23 at the rear of the vehicle body frame 2. The bed 8 covers all the upper surface of the vehicle body frame 2, and corresponds to a steel table screwed in front of and at the rear of the vehicle body frame 2 together with left and right fences 27L and 27R for the bed.

Figure 4:
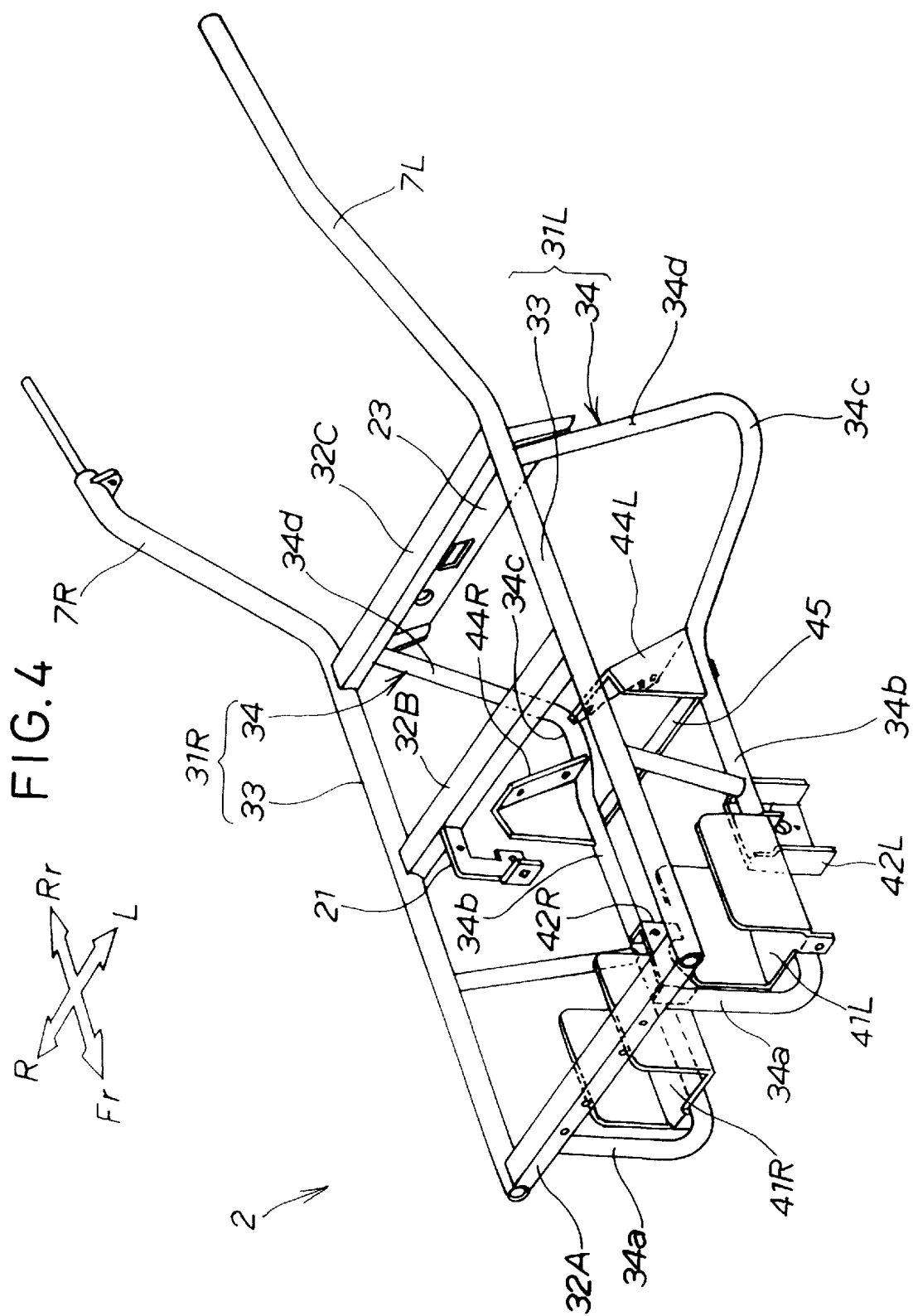
FIG. 4 is a perspective view of a vehicle body frame for use with the motor-assisted single-wheel cart of FIG. 1.

FIG. 4 is a perspective view of the vehicle body frame. With reference to FIG. 4, the vehicle body frame 2 of this embodiment has a pair of left and right side members 31L and 31R extending to a longitudinal direction of the vehicle body, and three cross members 32A, 32B and 32C connecting between them. The vehicle body frame 2 is formed in a rectangular shape as seen from a plan view as shown in the drawing. The vehicle body frame 2 is constituted by a pipe. The left side member 31L comprises an upper horizontal member 33 extending in a longitudinal direction of the vehicle body and a lower member 34 connected to a lower portion of the upper horizontal member 33. The upper horizontal member 33 has a portion extended so as to be upward inclined rearward from a rear end as the operation handle 7L. The right side member 31R has the same structure as that of the left side member 31L.

The three cross members, that is, a front, middle and rear cross members 32A, 32B and 32C are respectively rectangular pipes obtained by connecting between front ends, between middle portions and between rear portions in the left and right upper horizontal members 33 and 33.

The lower member 34 is a channel-shaped member in which an upper portion is opened as seen from the side surface (refer to FIG. 2). The lower member 34 is an integrally formed product comprising a horizontal portion 34b extending in a longitudinal direction of the vehicle body in parallel to the upper horizontal member 33, a front vertical portion 34a perpendicularly extending upward from a front end of the horizontal portion 34b, a leg portion 34c bending downward from a rear end portion of the horizontal portion 34b in a V-shaped manner, and a rear standing portion 34d extending upward from a rear and upper portion of the leg portion 34c in parallel to the vertical portion 34a.

An upper end of the front vertical portion 34a in the lower member 34 is connected to the front cross member 32A at a position slightly closer to the center of the lateral direction than the upper horizontal member 33. The horizontal portion 34b extends in parallel to the upper horizontal member 33. The V-shaped leg portion 34c expands outward with respect to a lateral direction. An upper end of the rear standing portion 34d is connected to a rear portion of the upper horizontal member 33. The leg portion 34c serves as a stand for making the motor-assisted single-wheel cart 1 (refer to FIG. 1) stand alone.

The battery holders 41L and 41R are mounted to each of the front portions of the left and right horizontal portions 34b and 34b. At a portion overlapping with the rear portion of the battery holders 41L and 41R, the brackets 42L and 42R for the axle are mounted to the lower surface of the left and right horizontal portions 34b and 34b. The left and right connection members 43L and 43R are respectively interposed between the left and right upper horizontal members 33 and 33, and the horizontal portions 34b and 34b of the left and right lower members 34 and 34 at a position of the respective brackets 42L and 42R for the axle. The brackets 44L and 44R for the first speed reduction mechanism are fixed and mounted to each of the rear end portions of the left and right horizontal portions 34b and 34b. Further, the left and right horizontal portions 34b and 34b are connected by a plate-like lower cross member 45 between the rear end portions.

The battery holders 41L and 41R are made of a steel plate member for covering almost all the portions of the batteries 4L and 4R (refer to FIG. 1) so as to protect from the outer portion. These members 41L and 41R are respectively constituted by bottom plates 41a and 41a, inner plates 41b and 41b, and outer plates 41c and 41c, and are formed in a channel shape in which an upper portion is opened as seen from a front surface. Further, the battery holders 41L and 41R respectively have stays 41d and 41d in front and at the rear thereof.

Figure 5:
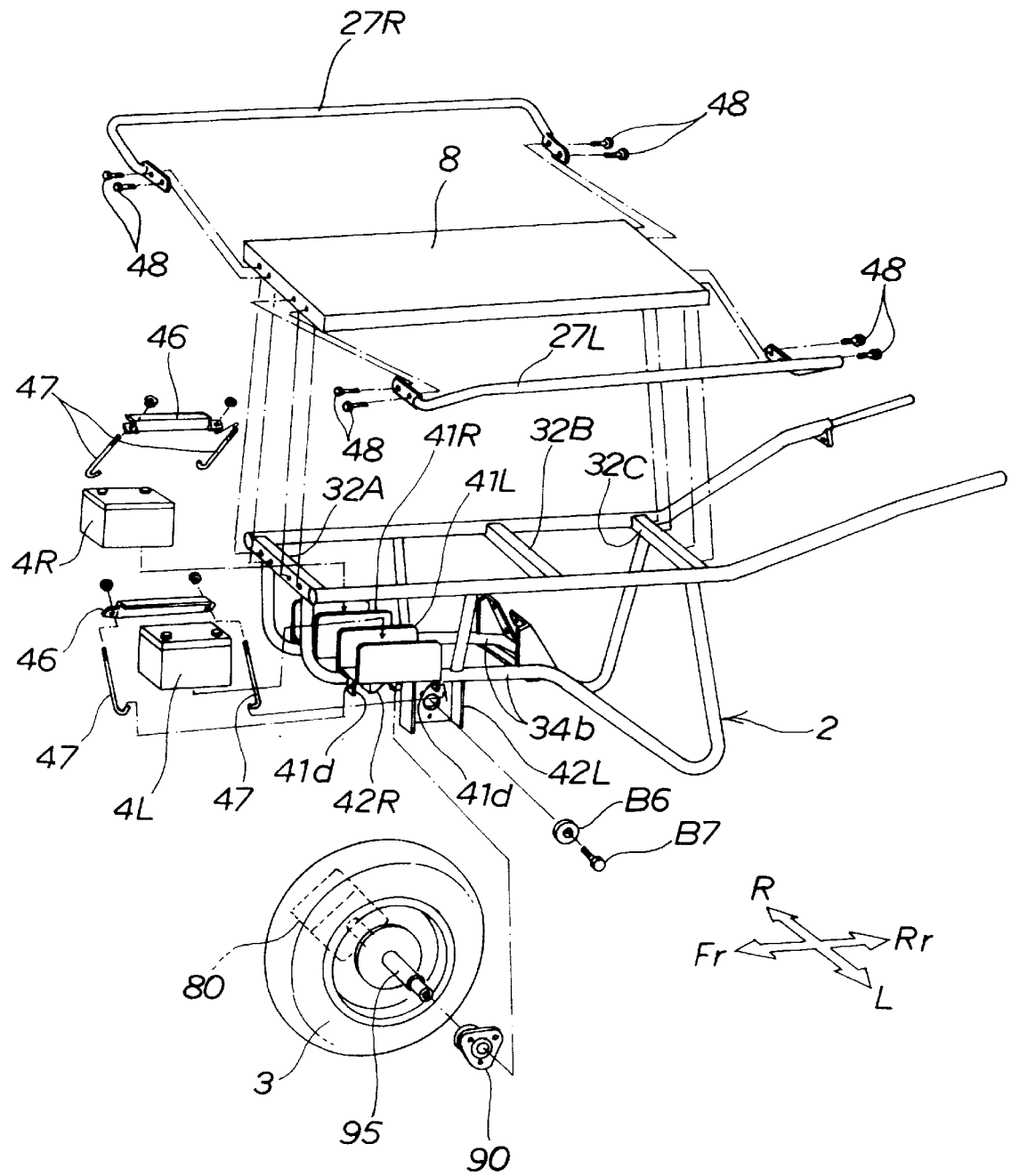
FIG. 5 is an exploded perspective view of the motor-assisted single-wheel cart as shown in FIG. 1.

FIG. 5 shows a state of exploding the motor-assisted single-wheel cart in accordance with the present invention. In FIG. 5, a mounting structure for the battery is made such that the batteries 4L and 4R are placed on the battery holders 41L and 41R, patches 46 and 46 having an L-shaped cross section are placed in upper corner portions of the batteries 4L and 4R, and the patches 46 and 46 are fastened to each of the stays 41d by a plurality of hook bolts 47, whereby the batteries 4L and 4R are mounted to the horizontal portions 34b and 34b (refer to FIG. 1).

As mentioned above, since the batteries 4L and 4R corresponding to a heavy article are placed and fixed on the horizontal portions 34b and 34b, it is not necessary to provide the other member necessary for mounting the batteries 4L and 4R, for example, a cross member.

In order to take out the left and right batteries 4L and 4R, at first, the bolts 48 are taken out and the left and right fences 27L and 27R for the bed are taken out. Next, the bed 8 is lifted up and taken out from the vehicle body frame 2. Thereafter, the hook bolts 47 are taken out, and the batteries 4L and 4R are pulled up from the above of the vehicle body frame 2. In order to mount the left and right batteries 4L and 4R, it is performed in accordance with inverse orders to the orders for taking out.

Figure 6:
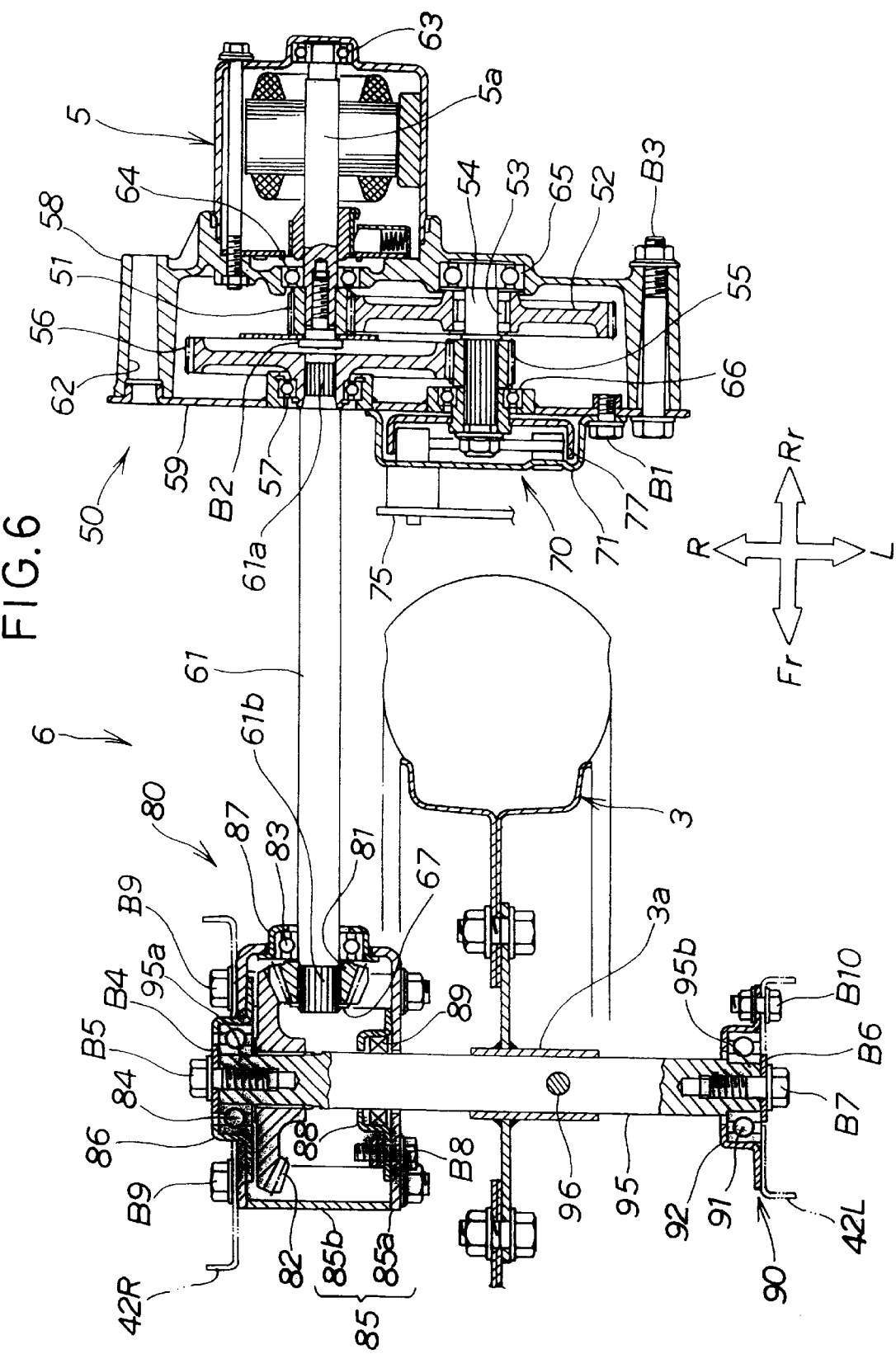
FIG. 6 is a detailed cross-sectional view of a power transmission mechanism shown in FIG. 2.

FIG. 6 shows a cross sectional structure of the power transmission mechanism 6 as seen from a direction of an arrow 6 in FIG. 2.

The first speed reduction mechanism 50 of the power transmission mechanism 6 is constituted by a first small gear 51 connected to an output shaft 5a of the motor 5, a first large gear 52 meshed with the first small gear 51, a middle shaft 54 connected to the first large gear 52 through a one-way clutch 53, a second small gear 55 connected to the middle shaft 54, a second large gear 56 meshed with the second small gear 55, a bearing 57 rotatably supporting the second large gear 56, a first housing 58 for receiving the gears 51, 52, 55 and 56, the middle shaft 54 and the bearing 57, and a lid 59. The first speed reduction mechanism 50 corresponds to a two-step speed reduction mechanism for performing a second step speed reduction by the first small gear 55 and the second large gear 56 after performing a first step speed reduction by the first small gear 51 and the first large gear 52.

The first speed reduction mechanism 50 is, in a word, structured such that the motor 5 is mounted to the first housing 58, the second large gear 56 is arranged at the same position as that of the output shaft 5a of the motor 5 and a rotation of the motor 5 is reduced by a combination of the gears 51, 52, 55 and 56 constituting spur gears.

The one-way clutch 53 corresponds to a clutch which can only transmit a power from the motor 5 to the axle 95. Particularly, it is possible to transmit a power from the first large gear 52 to the middle shaft 54, however, it is impossible to transmit a power from the middle shaft 54 to the first large gear 52. Since the one-way clutch 53 is provided in the first speed reduction mechanism 50 in which the gear rotates at a relatively high speed, it is possible to make a transmission torque small, so that the one-way clutch 53 can be made compact and low cost.

The middle shaft 54 corresponds to a shaft for supporting the first large gear 52 and the second small gear 55. A bolt hole 62 for screwing to the brackets 44L and 44R for the first speed reduction mechanism as shown in FIG. 4 is formed in the first housing 58.

The first speed reduction mechanism 50 is provided with a brake mechanism 70 for braking the rotation of the middle shaft 54. The brake mechanism 70 is constituted by a combination of a brake cover 71 mounted to the lid 59 by a bolt B1 and a brake drum 77 mounted to an end of the middle shaft 54, however, the detailed structure will be described with reference to FIG. 7.

In the drawing, reference numerals 63, 64, 65 and 66 denote a bearing. Reference symbol B2 denotes a fastening bolt for mounting the first small gear 51 to the output shaft 5a, and reference symbol B3 denotes a fastening bolt for mounting the lid 59 to the first housing 58.

The second speed reduction mechanism 80 is constituted by a small bevel gear 81 connected to the transmission shaft 61, a large bevel gear 82 connected to the axle 95, a bearing 83 supporting the other end of the transmission shaft 61, a bearing 84 supporting an end of the axle 95, and a second housing 85 for receiving the small and large bevel gears 81 and 82 and the bearings 83 and 84. The second speed reduction gear 80 corresponds to a one-step speed reduction mechanism which is reduced by the small bevel gear 81 and the large bevel gear 82. The second housing 85 is constituted by combining two housing portions 85a and 85b in a box shape.

Here, a connection relation of the transmission shaft 61 extending in a longitudinal direction will be described. The transmission shaft 61 is structured such that an end 61a thereof is inserted to an output side of the first speed reduction mechanism 50 so as to be capable of being drawn out, and the other end 61b is inserted to an input side of the second speed reduction mechanism 80. Particularly, the one end 61a of the transmission shaft 61 is connected to the second large gear 56 as an output side of the first speed reduction mechanism 50 by a spline fitting. The other end 61b of the transmission shaft 61 is connected to the small bevel gear 81 as an input side of the second speed reduction mechanism 80 by a spline fitting. The other end 61b of the transmission shaft 61 is mounted to the second speed reduction mechanism 80 by a stop ring 67 and a step in the shaft so as to be capable of moving in a longitudinal direction of the shaft.

Next, a connection relation of the axle 95 will be described. An end 95a of the axle 95 is inserted to the second speed reduction mechanism 80 so that the axle 95 crosses an extending line of the transmission shaft 61. The other end 95b is supported by the bearing portion 90. Particularly, the second speed reduction mechanism 80 transmits an assisting power transmitted from the motor 5 through the transmission shaft 61 to the axle 95 by changing a direction by means of the small and large bevel gears 81 and 82. Accordingly, the axle 95 is arranged so as to cross the transmission shaft 61.

An end 95a of the axle 95 is prevented from taking out from the bearing 84 by a plain washer B4 and a fastening bolt B5. The other end 95b of the axle 95 is prevented from taking out from the bearing 91 of the bearing portion 90 by a plain washer B6 and a fastening bolt B7.

The wheel 3 is structured such as to be capable of being taken out from the axle 95. That is, the wheel 3 is structured such that a hub 3a of the wheel 3 is fitted to the axle 95 and the hub 3a and the axle 95 are connected by a pin 96, so that the wheel 3 and the axle 95 are commonly rotated. It is structured such that the wheel 3 can be taken out from the axle 95 by drawing out the pin 96.

The bearing holder 86 holding the bearing 84 projects rightward from a side wall of the second housing 85.

In the drawing, reference numeral 87 denotes a bearing holder for holding the bearing 83. Reference numeral 88 denotes a seal holder for holding an oil seal 89. Reference numeral 92 denotes a bearing holder for holding a bearing 91. The bearing holder 92 is mounted to the bracket 42L for the axle through a bolt B10. Reference numeral B8 denotes a mounting bolt for mounting the seal holder 88 to the housing portion 85a. The second speed reduction mechanism 80 is mounted to the right bracket 42R for the axle by a bolt B9.

Figure 7:
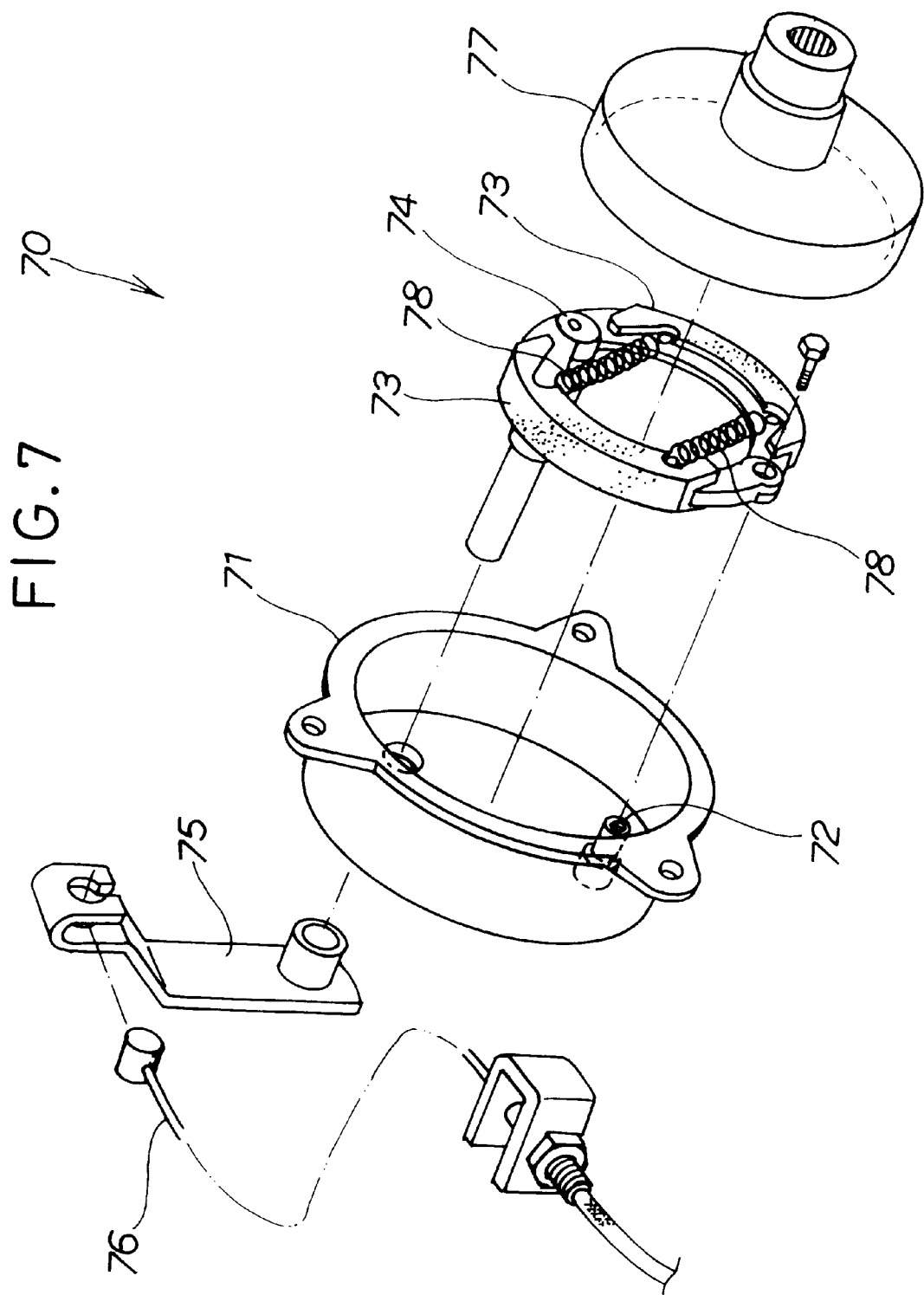
FIG. 7 is an exploded perspective view of a brake mechanism shown in FIG. 6.
Figure 8:
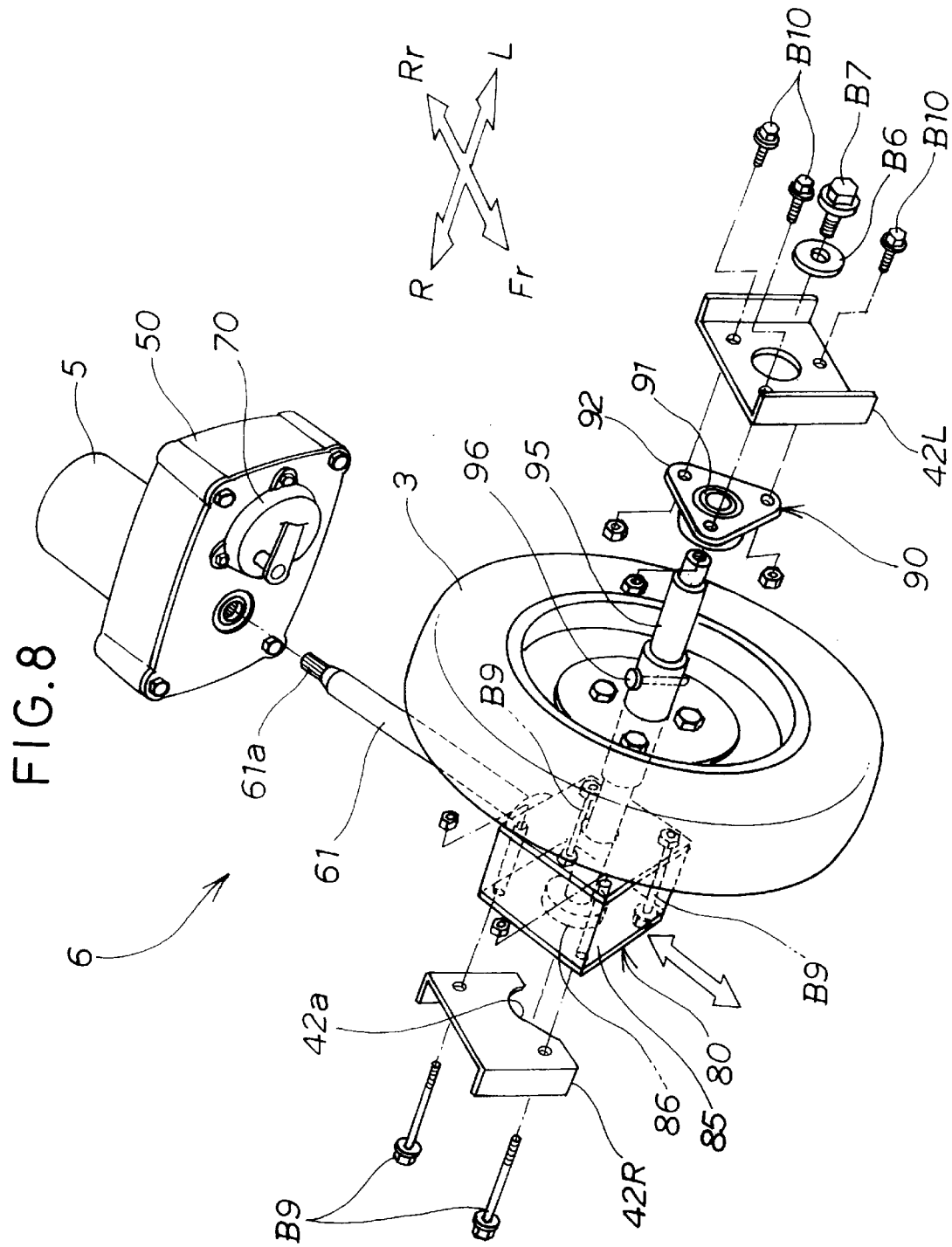
FIG. 8 is an exploded perspective view showing the power transmission mechanism, an axle and a wheel shown in FIG. 2.

FIG. 7 is an exploded perspective view which shows a brake mechanism 70 in the first speed reduction mechanism.

The brake mechanism 70 corresponds to a diameter expansion type drum brake. The brake mechanism 70 is constituted by a brake cover 71, brake shoes 73 and 73 with brake pads mounted to the brake cover 71 through a bush 72, a cam 74 expanding the diameters of the brake shoes 73 and 73, a cam lever 75 rotating the cam 74, a brake cable 76 drawing the cam lever 75, a brake drum 77 surrounding the brake shoes 73 and 73, and tensional springs 78 and 78 compressing the diameters of the brake shoes 73 and 73. The brake cable 76 is connected to the brake lever 12 in FIG. 1.

A rotation of the brake drum 77 is braked by the brake shoes 73 and 73 by mounting the brake drum 77 to the middle shaft 54 shown in FIG. 6 and mounting the other brake cover 71 and the brake shoes 73 and 73 to the lid 59, so as to stop the motor-assigned single-wheel cart 1.

Since the brake mechanism 70 is mounted to the first speed reduction mechanism 50 in which the gear rotates at a relatively high speed, the brake force is made small, so that the brake mechanism 70 can be made compact and low cost.

FIG. 7 is an exploded perspective view which shows the power transmission mechanism, the axle and the wheel.

The second housing 85 of the second speed reduction mechanism 80 is formed in a box shape by four bolts B9. The second speed reduction mechanism 80 is mounted to an inner surface of the right bracket 42R for the axle by utilizing two bolts B9 among them.

As described in FIG. 6, since the bearing holder 86 protrudes from the side wall of the second housing 85, a notch portion 42a through which the bearing holder 86 can pass is formed in the right bracket 42R for the axle. The notch portion 42a is formed in a shape downward inclining forward, and is structured such as to be capable of drawing out the bearing holder 86 to a front and lower direction together with the transmission shaft 61.

A bearing holder 92 of a bearing portion 90 receives and holds a bearing 91. The bearing holder 92 is mounted to the inner surface of the left bracket 42L for the axle by three bolts B10.

Next, an operation of the motor 5 and the power transmission mechanism 6 will be described below with reference to FIG. 6.

The motor 5 outputs a predetermined assisting power on the basis of a control signal of the control portion 22 shown in FIG. 2. The assisting power from the output shaft 5a is transmitted to the wheel 3 in accordance with a path having the order of the first small gear 51, the first large gear 52, the one-way clutch 53, the middle shaft 54, the second small gear 55, the second large gear 56, the transmission shaft 61, the small bevel gear 81, the large bevel gear 82 and the axle 95, thereby driving the wheel 3.

Next, a method of taking out the second speed reduction mechanism 80, the axle 95 and the wheel 3 will be described below with reference to FIGS. 9A, 9B, 10A, 10B and 11.

At first, in FIG. 9A, the fastening bolt B7 is taken out so as to make the axle 95 in a state of capable of being drawn out from the bearing portion 90 (an arrow ①). Next, the bolt B10 is taken out so as to separate the bearing portion 90 from the left bracket 42L for the axle (an arrow ②). Thereafter, the upper side two bolts B9 shown in FIG. 9B are taken out so as to separate the second speed reduction mechanism 80 from the right bracket 42R for the axle (an arrow ③).

Thereafter, as shown in FIGS. 10A and 10B, the one end 61a of the transmission shaft 61 is drawn out from the first speed reduction mechanism 50 (an arrow ④). At this time, the second speed reduction mechanism 80, the axle 95 and the wheel 3 are simultaneously taken out. A notching direction of the notch portion 42a is the same as a drawing-out direction of the transmission shaft 61, and the bearing holder 86 of the second speed reduction mechanism 80 is easily taken out from the right bracket 42R for the axle.

Figure 11:
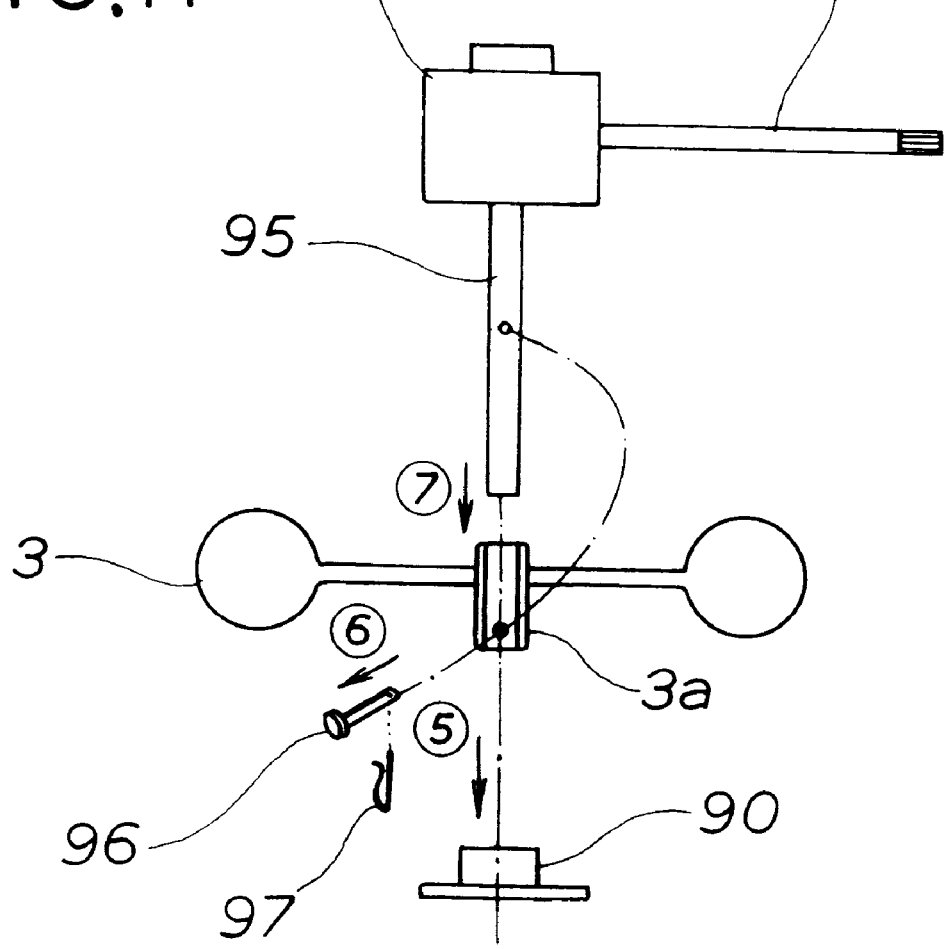
FIG. 11 is a schematic view for illustrating a state of taking off of the wheel from the axle.

Next, as shown in FIG. 11, after the axle 95 is drawn out from the bearing portion 90 (an arrow ⑤), and a split cotter pin 97 is taken out from the pin 96, the pin 96 is drawn out from the hub 3a and the axle 95 (an arrow ⑥). Finally, the hub 3a is drawn out from the axle 95, whereby the wheel 3 is taken out (an arrow ⑦).

In this case, the order of mounting the transmission shaft 61, the second speed reduction mechanism 80, the axle 95 and the wheel 3 is inverse to the order of taking out mentioned above.

Figure 12:
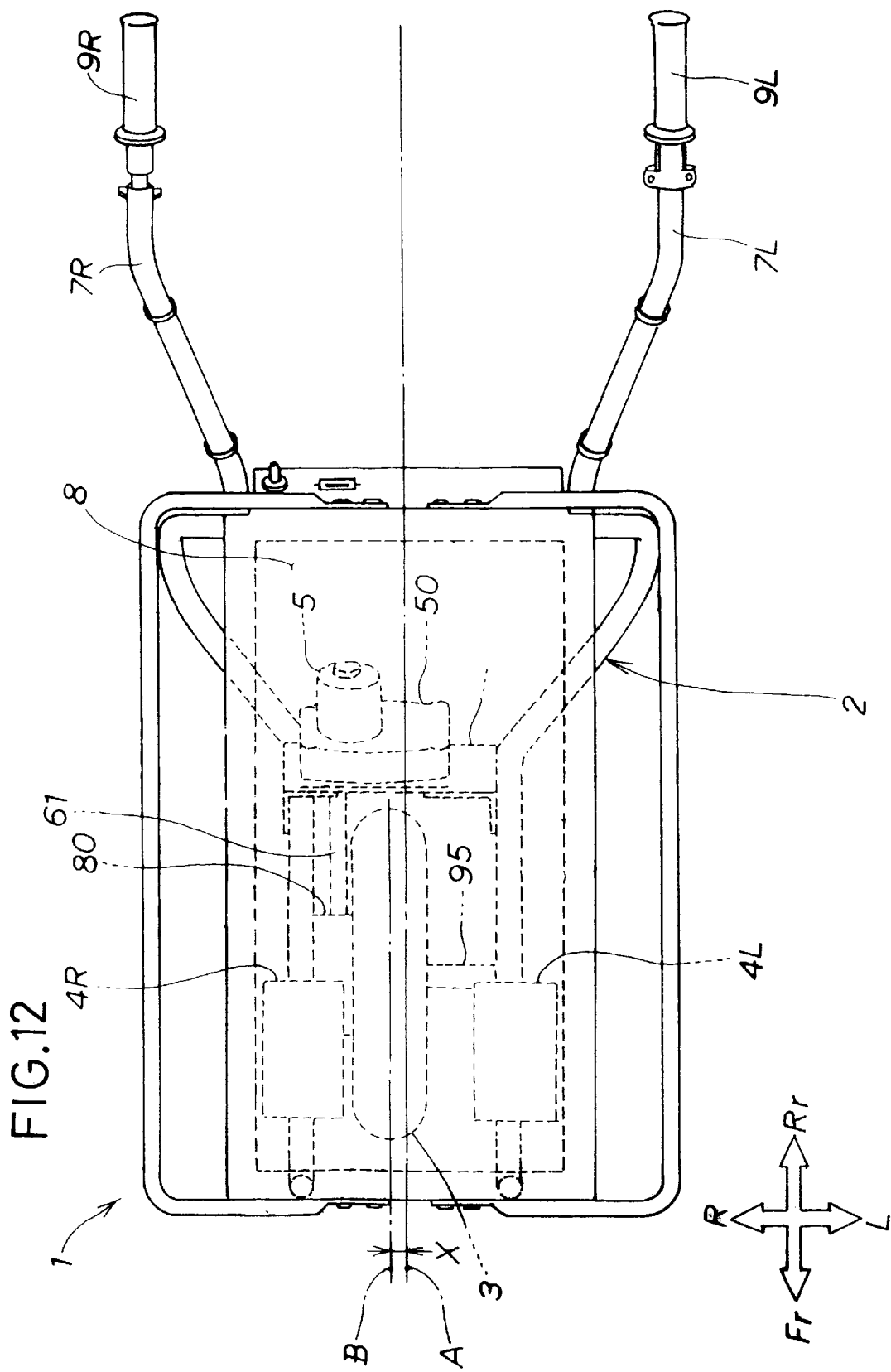
FIG. 12 is a plan view showing a modified embodiment wherein a wheel of a motor-assisted single-wheel cart is shifted from a center portion in a lateral direction.

FIG. 12 shows a modified embodiment of the motor-assisted single-wheel cart 1 shown in the embodiment mentioned above.

The second speed reduction mechanism 80 shown in the embodiment is arranged at a position rightward off-set from a center A in a lateral direction of the vehicle body frame 2. Accordingly, the lateral weight balance of the motor-assisted single-wheel cart tends to be shifted. Then, in accordance with this modified embodiment, a center B in a lateral direction of the wheel 3 is also off-set rightward from the center A in a lateral direction at a degree of a size X. Since the wheel 3 is off-set in the same direction as the second speed reduction mechanism 80, in the motor-assisted single-wheel cart 1, the lateral weight balance is not shifted and a straight running performance is increased.

In the embodiments mentioned above, each of the gears of the first and second speed reduction mechanism 50 and 80 is not limited to the spur gear or the bevel gear. Further, in the second speed reduction mechanism 80, in order to cross the transmission shaft 61 and the axle 95, the mechanism is structured such that the direction of the output side is turned with respect to the input side and the small and large bevel gears 81 and 82 are combined, however, the structure is not limited to this, for example, a worm gear mechanism may be employed.

It is sufficient that the one-way clutch 53 and the brake mechanism 70 are structured such as to be provided in the first speed reduction mechanism 50, and the mounting position can be optionally selected.

Figure 13:
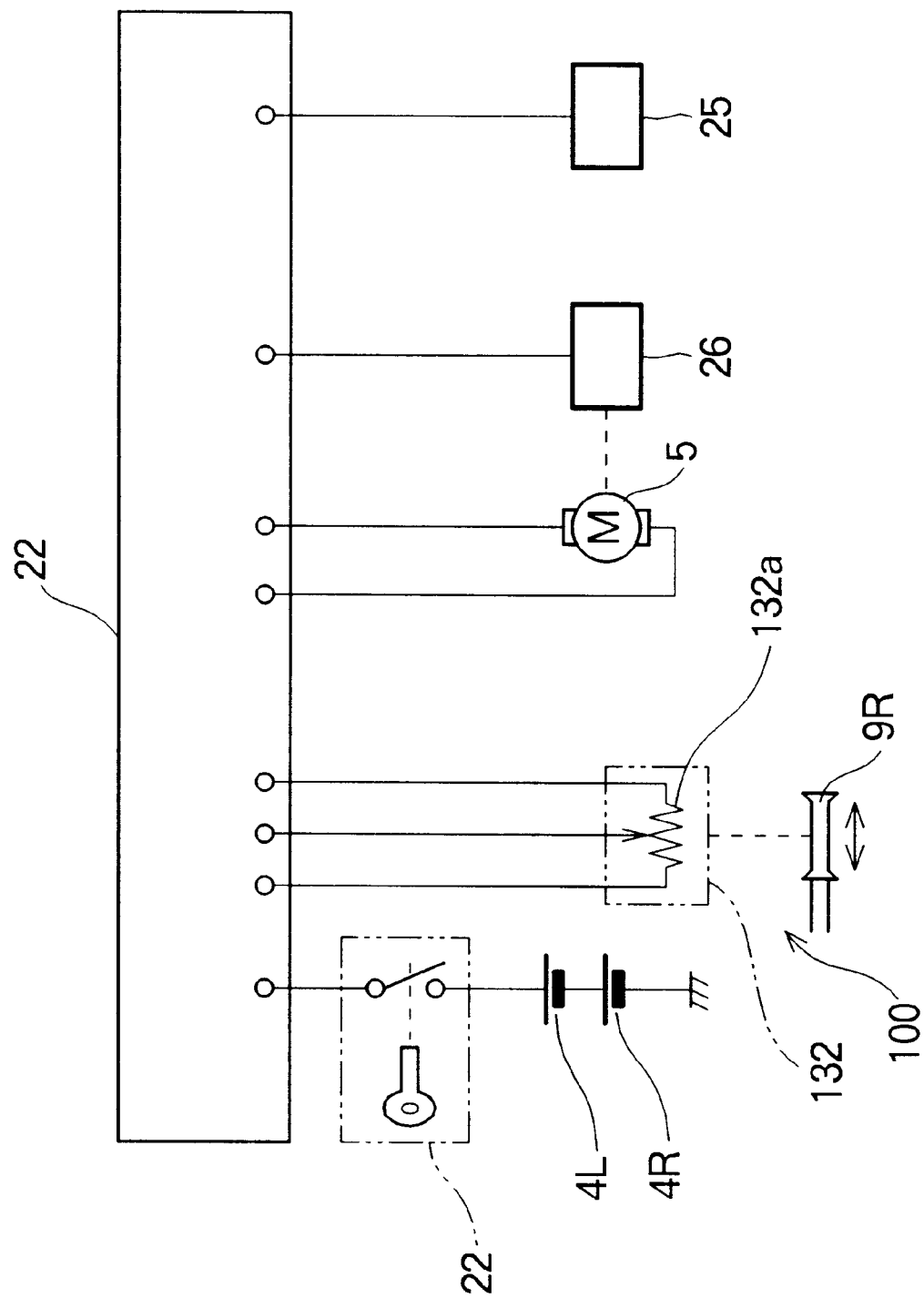
FIG. 13 is a electric circuit diagram of a motor-assisted single-wheel cart in accordance with the present invention.

FIG. 13 shows a circuit controlling the motor 5 by an assisting power operation mechanism 100.

An electric circuit of the motor-assisted cart is structured such that a control portion 22 is connected to the batteries 4L and 4R, a key switch 24 corresponding to a main switch, a moving amount detecting portion 132 of an assisting power operation mechanism 100, the motor 5, a vehicle speed detecting portion 26 for detecting a rotational speed of the motor 5 and a battery residual quantity indicator 25 for indicating a residual quantity of the batteries 4L and 4R. The control portion 22 controls the motor 5 in response to the output of the moving amount detecting portion 132.

Figure 14:
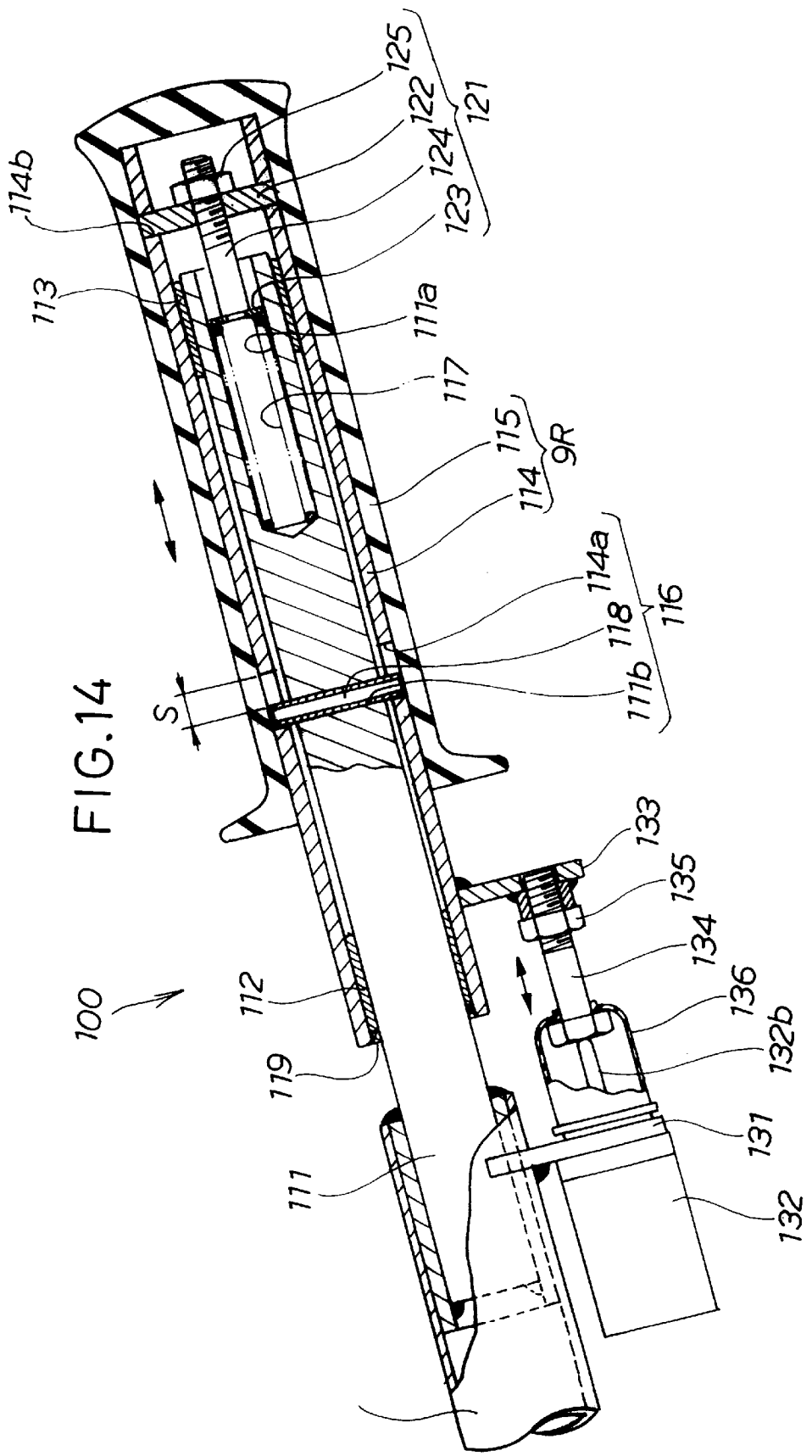
FIG. 14 is a cross-sectional view of a right operation handle and an assisting power operation mechanism of FIG. 1.

FIG. 14 shows a detailed structure of the assisting power operation mechanism 100.

The right operation handle 7R is made of a pipe material, and is structured such that a circular rod bar 111 is inserted to a front end portion of the pipe material and welded thereto. A grip 9R is a slide type grip, and is constituted by a pipe slider portion 114 slidably inserted to the bar 111 of the right operation handle 7R and a rubber grip portion 115 covered over the slider portion 114.

The slider portion 114 is fitted to the bar 111 through two front and rear bushes 112 and 113.

The assisting power operation mechanism 100 is provided with a stopper mechanism 116 for restricting a moving amount S of the grip 9R, an elastic member 117 urging the grip 9R toward the operator, an adjusting mechanism 121 initially adjusting an operation balance point of the elastic member 117, and the moving amount detecting portion 132 mounted to the pipe front end of the operation handle 7R through a hanger 131.

The stopper mechanism 116 is constituted by a pin 118 fixed to the bar 111 in perpendicular to a longitudinal direction of the shaft, and an elongate hole 114a formed in the slider portion 114 so as to fit the pin 118 and being longer in an axial direction. A length of the elongate hole 114a is set such that the slider portion 114 can move at a predetermined moving amount S. As mentioned above, since the stopper mechanism 116 is structured such that the elongate hole 114a and the pin 118 are combined, it is possible to restrict the moving amount of the grip 9R and prevent a rotation by a simple structure. The elongate hole 114a and the pin 118 may be arranged in a reverse manner. The elastic member 117 is constituted by a compression spring inserted to a blind hole 111a formed on a rear end surface (a right end surface in the drawing) of the bar 111.

The adjusting mechanism 121 is constituted by a bolt mounting plate 122 mounted to a rear end portion of the slider portion 114, and adjusting bolt 124 threaded to the bolt mounting plate 122 so as to compress the elastic member 47 through a plain washer 123, and a lock nut 125 for the adjusting bolt. Accordingly, an operation balance point of the elastic member 117 can be initially adjusted with ease only by moving forward and backward the adjusting bolt 124.

An arm 133 is mounted to a base end portion of the slider portion 114. A pressing bolt 134 is threaded to the arm 133 so as to extend in a direction of the operation handle 7R in parallel to the slider portion 114. The pressing bolt 134 is locked to the arm 133 by a lock nut 135.

The moving amount detecting portion 132 detects a moving amount of the grip 9R moving in a direction of the operation handle 7R by a forward and backward motion of a push rod 132b so as to convert to an electric signal. For example, the moving amount detecting portion 132 is constituted by a variable resistor 132a shown in FIG. 13. The push rod 132b of the moving amount detecting portion 132 is arranged in coaxial with the pressing bolt 134 and so as to press the push rod 132b by the pressing bolt 134.

Since the member for pushing the push rod 132b is constituted by the pressing bolt 134 threaded to the arm 133, a reference point for detecting in the moving amount detecting portion 132 can be easily set only by adjusting a threading amount of the pressing bolt 134 to the arm 133.

In the drawing, reference numeral 136 denotes a rubber cover for covering a head portion of the pressing bolt 134 and the push rod 132b.

A portion between an outer surface of the bar 111 and an opening end of the slider 114 is sealed by the seal member 119. Accordingly, there is no risk that a muddy water and a dust enter into a gap between the bar 111 and the slider portion 114. Since the stopper mechanism 116, the elastic member 117 and the adjusting mechanism 121 are arranged inside the grip portion 115, these mechanisms 116 and 121 and the elastic member 47 are not exposed to the muddy water and the dust.

Figure 15:
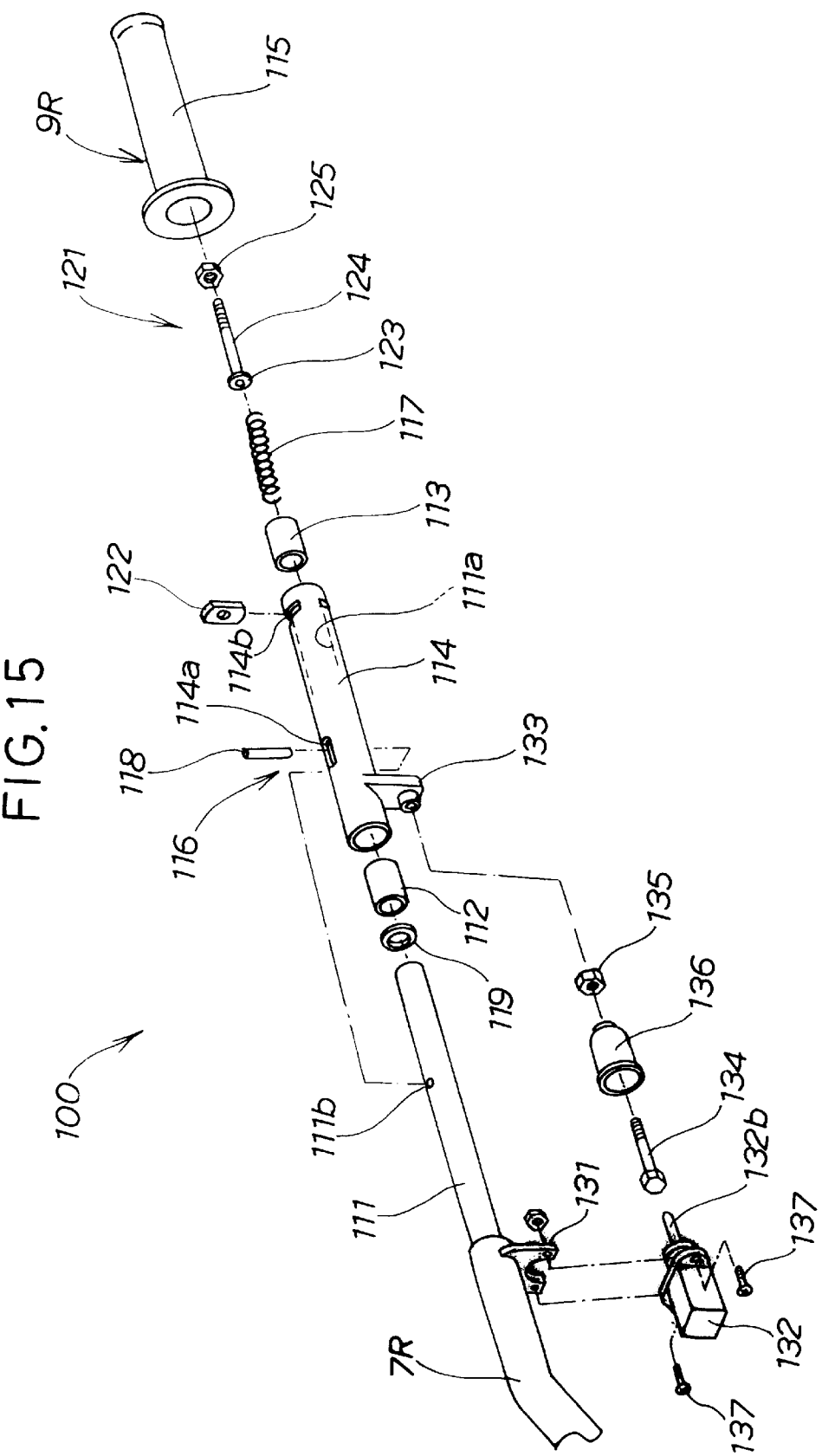
FIG. 15 is an exploded perspective view of the assisting power operation mechanism shown in FIG. 14.

Next, an order of assembling the assisting power operation mechanism 100 will be described below with reference to FIG. 15.

At first, two bushes 112 and 113 and the seal member 119 are fitted to the slider portion 114. Next, after the slider portion 114 is inserted to the bar 111 of the right operation handle 7R, the circular hole 111b and the oblong hole 114a are aligned with each other, and the pin 118 is struck into the circular hole 111b. Then, after the elastic member 117 and the plain washer 123 are inserted to the blind hole 111a of the bar 111, the bolt mounting plate 122 is pressed and fitted to a rectangular hole 114b of the slider portion 114. The operation balance point of the elastic member 117 is initially adjusted by threading the adjusting bolt 124 to the bolt mounting plate 122. Accordingly, a relation between a force of pressing the slider portion 114 in a longitudinal direction of the shaft and a moving amount of the slider portion 114 can be accurately adjusted. When the adjusting operation is completed, a lock nut 125 is fastened. The grip portion 115 is covered over the slider portion 114. A pressing bolt 134 placing a cover 136 over an arm 133 of the slider portion 114 is loosely threaded through a lock nut 135. The moving amount detecting portion 132 is mounted to the hanger 131 by screws 137 and 137. The reference point for detecting the moving amount detecting portion 132 is set by adjusting a threading amount of the pressing bolt 134. Finally, the lock nut 135 is fastened, and the cover 136 is mounted to the moving amount detecting portion 132, whereby the assembling operation is completed.

In FIG. 14, when the grip 9R is clasped and the grip 9R is pushed to a direction of the operation handle 7R, the pushing force acts on the elastic member 117 in accordance with the path having the order of the slider portion 114, the bolt mounting plate 122, the adjusting bolt 124 and the plain washer 123. Accordingly, the grip 9R slides at a moving amount in response to the pushing force against a reaction force of the elastic member 117. The pressing bolt 134 slides at the same moving amount as that of the grip 9R so as to push the push rod 132b of the moving amount detecting portion 132. The moving amount detecting portion 132 generates an output in response to a sliding amount of the push rod 132b.

Figure 16A:
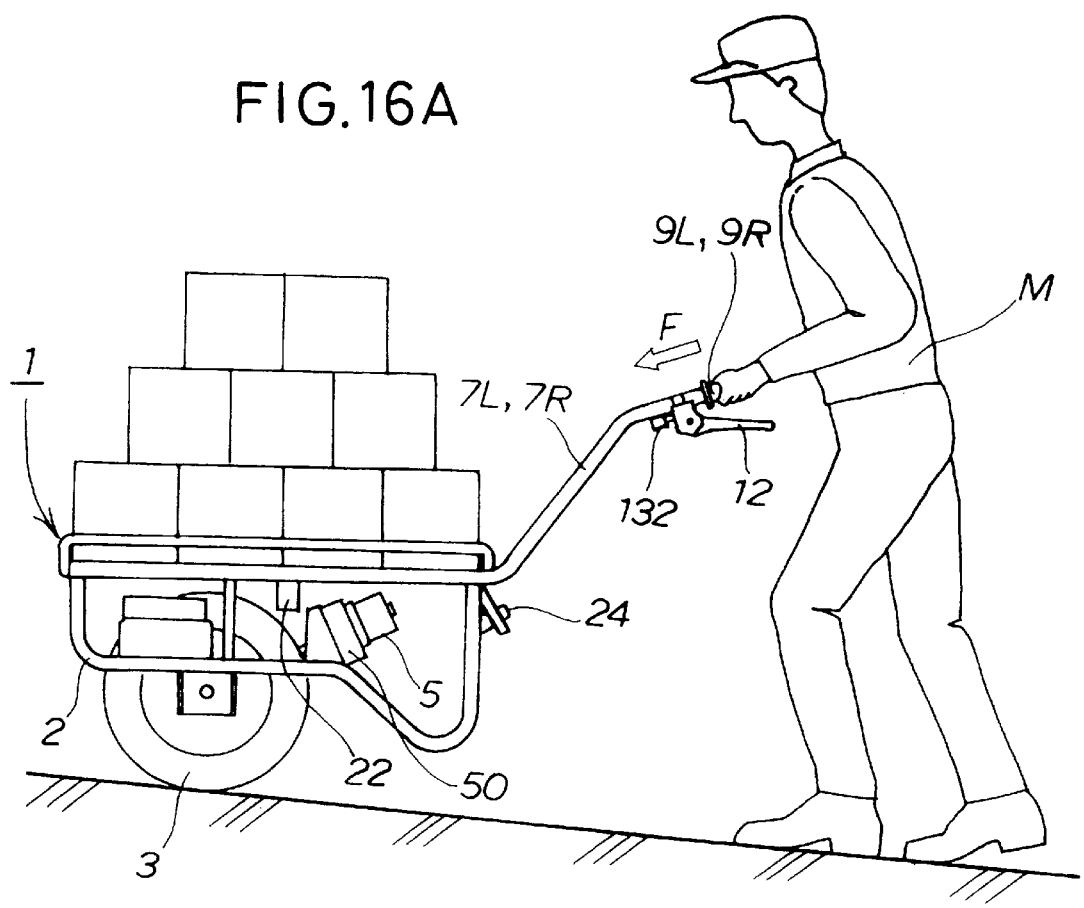
FIGS. 16A and 16B are schematic views showing a use state of the motor-assisted single-wheel cart.
Figure 16B:
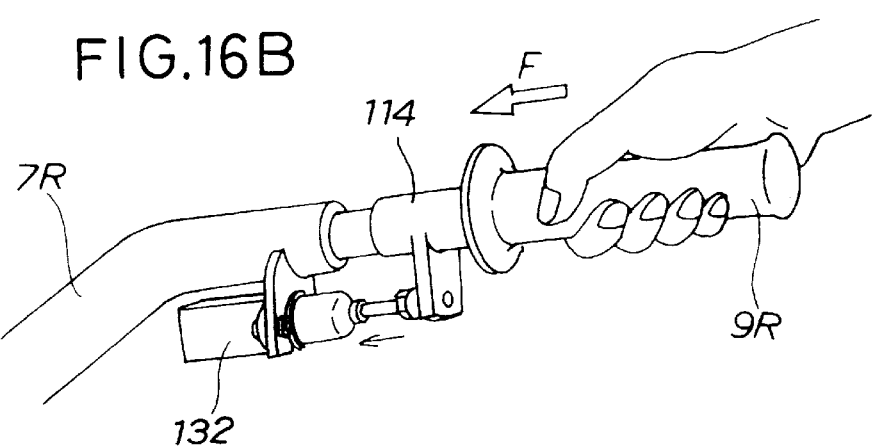

FIGS. 16a and 16b show a use state of a motor-assisted single-wheel cart in accordance with the present invention.

In the case of propelling the motor-assisted single-wheel cart 1 loading a light article on a flat ground, a pushing force F with clasping the left and right grips 9L and 9R is small. Accordingly, since the moving amount of the right grip 9R is small, the output of the moving amount detecting portion 132 is small. Therefore, the control portion 22 does not generate a control signal to the motor 5. As a result, the motor-assisted single-wheel cart 1 can be propelled only by a human force. In this case, since the one-way clutch 53 (refer to FIG. 6) is installed within the first speed reduction mechanism 50, a rotational force of the wheel 3 is not transmitted to the motor 5.

As shown in FIG. 16A, in the case of propelling the motor-assisted single-wheel cart 1 loading a heavy article or propelling the motor-assisted single-wheel cart 1 on an upward slope, the pushing force F for pushing the cart 1 with clasping the grips 9L and 9R becomes large. When the pushing force F of the operator M is equal to or more than a predetermined value, the grip 9R shown in FIG. 16B moves at a moving amount in response to the pushing force F, the control portion 22 generates a control signal to the motor 5 on the basis of the output of the moving amount detecting portion 132 at this time. The moving amount detecting portion 132 changes an output in response to the pushing force F, and the control portion 22 controls the motor 5 so as to output the corresponding assisting power. Accordingly, the assisting power is added to the wheel 3, and a labor for pushing the cart 1 is lightened.

As mentioned above, by clasping and pushing the trips 9L and 9R, the operator M can propels the motor-assisted single-wheel cart 1 only by a human force or propels with being applied the assisting power. That is, in any of the cases of propelling the motor-assisted single-wheel cart 1 only by a human force and propelling with being applied the assisting power, the operator M only continues a simple operation, that is, an operation of clasping and pushing the grips 9L and 9R.

Since the assisting power can be adjusted only by the pushing operation of the grips 9L and 9R, no special operation for adjusting the assisting power is required. Accordingly, a good operation feeling can be obtained.

Particularly, since the motor-assisted single-wheel cart 1 has only a single wheel 3, it is impossible to move both hands apart from the left and right grips 9L and 9R during a conveyance. Even when the assisting power is required during a propelling operation of the motor-assisted single-wheel cart 1 of this kind by hands, it is not necessary for the operator M to perform a special operation, but it is sufficient to only continue the same pushing operation as that of the conventional hand-pushed type single-wheel cart.

That is, the motor-assisted single-wheel cart 1 can be advanced in a feeling of a normal wheelbarrow by pushing the operation handles 7L and 7R (the grips 9L and 9R) forward with lifting up them, so that the operation is easily performed. Since the operation handle 7L and 7R are strongly pushed when the load is heavy, the motor 5 generates a large assisting power in response to the pressing force, so that the burden of the operator M is lightened. When the cart is occupant or the load is light, the pushing force applied to the operation handles 7L and 7R is small, the assisting power is not generated.

As mentioned above, the motor-assisted single-wheel cart 1 can make sharp turns in the same manner as that of the conventional hand-pushed single-wheel cart, and the mobility is good even in a narrow operation area, so that it is easily used. Further, the burden of the operator M is small even when carrying a heavy article and climbing an upward slope. Still further, the burden of the operator M on the operation is light.

Obviously, various minor changes and modifications of the present invention are possible in the light of the above teaching. It is therefore to be understood that without departing from the scope of the appended claims the invention may be practiced otherwise than as specifically described.

What is claimed is:

1. A motor-assisted single-wheel cart comprising:
a vehicle body frame comprised of a pair of right and left side frame members each having an upper horizontal member and a lower member positioned below the upper horizontal member, the right and left side frame members being spaced apart from each other in a lateral direction;
an axle rotatably mounted to the lower member and positioned in front of a center portion of the vehicle body frame in a longitudinal direction;

a single wheel mounted to the axle and positioned in a center portion of the vehicle body frame in the lateral direction;

a pair of right and left operation handles each extending rearward from one of the upper horizontal members;

a bed mounted to an upper portion of the vehicle body frame;

a battery mounted to the lower member and arranged at a rear portion of the vehicle body frame around the axle;

a motor mounted to to lower member for generating an assisting power in correspondence to an operation force applied to the operation handle by a human hand; and a power transmission mechanism for transmitting an output of the motor to the axle;

wherein when the vehicle body frame is viewed from a side surface in the lateral direction, each lower member comprises a horizontal portion extending parallel to the upper horizontal member, a front vertical portion extending upwardly and vertically from a front end of the horizontal portion, a leg portion bending downwardly and upwardly from a rear end of the horizontal portion substantially in a V-shaped manner, and a rear vertical portion extending upwardly from the leg portion and disposed parallel to the front vertical portion, the motor being arranged rearwardly and upwardly of the axle so as to be disposed within a space surrounded by the lower member and the upper horizontal member.

2. A motor-assisted single-wheel cart comprising:

a vehicle body frame;

a single wheel mounted to a center portion of the vehicle body frame in a lateral direction;

a battery mounted to the vehicle body frame;

a motor mounted to the vehicle body frame for generating an assisting power in correspondence to an operation force by a human hand;

a power transmission mechanism mounted to the vehicle body frame for transmitting an output of the motor to the wheel;

an operation handle extending rearward from the vehicle body frame; and a bed mounted to an upper portion of the vehicle body frame;

wherein the power transmission mechanism comprises a first speed reduction mechanism arranged near the motor, a second speed reduction mechanism arranged near the wheel, and a transmission shaft for connecting the first and second speed reduction mechanisms to one another, an end of the transmission shaft being connected to the first speed reduction mechanism or the second speed reduction mechanism in such a manner as to freely pull out.

3. A motor-assisted single-wheel cart as claimed in claim 2; wherein the transmission shaft has a first end connected to the first speed reduction mechanism in such a manner as to be freely pulled out and a second end connected to the second speed reduction mechanism, the wheel having an axle having a first end connected to the second speed reduction mechanism in such a manner as to cross the transmission shaft, the wheel being mounted to the vehicle body frame in such a manner as to be removable from a second end of the axle opposite the first end thereof.

4. A motor-assisted single-wheel cart comprising:

a vehicle body frame;

at least one wheel mounted to a central part of the vehicle body frame in a widthwise direction thereof;

a motor mounted to the vehicle body frame for generating an assisting power in correspondence to an operation force applied by a human hand;

a power transmission mechanism mounted to the vehicle body frame for transmitting an output of the motor to the wheel;

a battery mounted to the vehicle body frame;

a bed mounted to an upper portion of the vehicle body frame;

an operation handle extending rearwardly and upwardly from the vehicle body frame;

a grip slidably provided at an end portion of the operation handle;

an elastic member for biasing the grip to a side of an operator;

a movement detecting portion for detecting an amount of movement of the grip toward the vehicle body frame; and a control portion mounted to the vehicle body frame for controlling the motor in response to an output of the movement detecting portion.

5. A motor-assisted single-wheel cart as claimed in claim 4; wherein the elastic member is disposed inside the grip.

6. A motor-assisted single-wheel cart comprising:

a frame comprised of a pair of side frame members and at least one cross member interconnecting the frame members in spaced-apart relation in a lateral direction of the frame, each of the side frame members having a first member extending generally transverse to the lateral direction and a second member having opposite end portions connected to the first member;

an axle mounted for rotation on the second members and disposed forwardly of a central portion of the frame in a longitudinal direction thereof;

a wheel mounted on the axle for rotation therewith and disposed at a central portion of the frame in the lateral direction thereof;

a pair of operation handles each extending from one of the first members;

a motor mounted on the second members for generating an assisting power in accordance with an operation force applied to the operation handles by an operator, the motor being disposed rearwardly of the axle;

a battery mounted on the second members and extending forwardly of the axle for activating the motor; and a power transmission mechanism for transmitting an output of the motor to rotate the axle.

7. A motor-assisted single-wheel cart according to claim 6; wherein the second member of each of the side frame members comprises a first portion disposed generally parallel to the first member, a pair of second portions connected to and disposed generally perpendicular to the first member, and a generally V-shaped portion disposed between the first portion and one of the second portions.

8. A motor-assisted single-wheel cart according to claim 7; wherein the motor is disposed within a space formed by the first and second members of the frame.

9. A motor-assisted single-wheel cart according to claim 6; wherein the motor is disposed within a space formed by the first and second members of the frame.

* * * * *